United States Patent
Kiyokawa et al.

(10) Patent No.: US 12,397,989 B2
(45) Date of Patent: Aug. 26, 2025

(54) ARTICLE STORAGE FACILITY

(71) Applicant: Daifuku Co., Ltd., Osaka (JP)

(72) Inventors: Wataru Kiyokawa, Tokyo (JP);
Daisuke Katagiri, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 162 days.

(21) Appl. No.: 18/268,724

(22) PCT Filed: Dec. 2, 2021

(86) PCT No.: PCT/JP2021/044271
§ 371 (c)(1),
(2) Date: Jun. 21, 2023

(87) PCT Pub. No.: WO2022/138049
PCT Pub. Date: Jun. 30, 2022

(65) Prior Publication Data
US 2024/0034557 A1 Feb. 1, 2024

(30) Foreign Application Priority Data

Dec. 22, 2020 (JP) .................................. 2020-212457

(51) Int. Cl.
*B65G 1/04* (2006.01)
*B65G 1/137* (2006.01)

(52) U.S. Cl.
CPC ......... *B65G 1/0421* (2013.01); *B65G 1/1378* (2013.01)

(58) Field of Classification Search
CPC ... B65G 1/1378; B65G 1/0421; B65G 1/0485
See application file for complete search history.

(56) References Cited

U.S. PATENT DOCUMENTS

| | | | | |
|---|---|---|---|---|
| 2018/0022551 A1* | 1/2018 | Gondoh | ............. | G06Q 10/0832 700/215 |
| 2018/0155127 A1* | 6/2018 | Meurer | ................ | B65G 1/0485 |
| 2019/0002202 A1* | 1/2019 | Collin | .................. | B65G 1/0485 |
| 2019/0218040 A1* | 7/2019 | Iida | ..................... | B65G 47/5104 |
| 2023/0271779 A1* | 8/2023 | Siraisi | .................. | B65G 1/0492 700/218 |

FOREIGN PATENT DOCUMENTS

| | | | | |
|---|---|---|---|---|
| EP | 1897822 A2 * | 3/2008 | ........... | B65G 1/0421 |
| JP | 63119509 U | 8/1988 | | |
| JP | 5769038 B2 * | 8/2015 | | |

* cited by examiner

*Primary Examiner* — Kaitlin S Joerger
(74) *Attorney, Agent, or Firm* — The Webb Law Firm

(57) ABSTRACT

A control device performs selection processing for determining a selected conveyor that is to be the destination of a target article. The selection processing is processing for, if a second conveyor in which an article of the same type as the target article is the most-upstream article and there is no adjacent same-type article group, and a second conveyor in which an articles of the same type as the target article is the most-upstream article and there is an even number of articles in the adjacent same-type article group, are pairing target conveyors and there is a pairing target conveyor, determining the pairing target conveyor as the selected conveyor, and if there is no pairing target conveyor, determining a second conveyor selected according to a predetermined basic selection rule as the selected conveyor.

6 Claims, 8 Drawing Sheets

ARTICLE STORAGE FACILITY

CROSS-REFERENCE TO RELATED APPLICATIONS

This application is the United States national phase of International Application No. PCT/JP2021/044271 filed Dec. 2, 2021, and claims priority to Japanese Patent Application No. 2020-212457 filed Dec. 22, 2020, the disclosures of which are hereby incorporated by reference in their entireties.

BACKGROUND OF THE INVENTION

Field of the Invention

The present invention relates to an article storage facility that includes a plurality of automated warehouse units each including a transport device and a storage rack for storing articles transported by the transport device, and includes a supply device for supplying articles to the respective transport devices of the plurality of automated warehouse units.

Description of Related Art

In such an article storage facility, there are cases in which a transport device included in an automated warehouse unit transports two articles together. An example of such an automated warehouse unit is disclosed in Japanese Utility Model Application Laid-Open No. S63-119509 (Patent Document 1). Hereinafter, in the description of this background art, reference numerals and names in Patent Document 1 are quoted in parentheses.

The automated warehouse unit of Patent Document 1 includes a transport device (cargo loading/unloading device 8) including a travel cart (11) that travels on a predetermined travel route (7), a storage rack including a plurality of storage portions (segmented storage spaces 2) arranged along the travel route (7), and a supply device (storage conveyor 21) for supplying articles to the transport device (8). With the direction along the travel route (7) set as the travel direction and the direction perpendicular to the travel direction set as the rack depth direction, the transport device (8) includes two transfer devices (loading/unloading tools 16A and 16B) that are mounted in the travel cart (11) and are arranged side by side in the travel direction, and each transfer device (16A and 16B) is able to hold two articles side by side in the rack depth direction. That is, the transport device (8) is configured such that each of the two transfer devices (16A, 16B) transports the two articles (6) together. In accordance with the configuration of the transport device (8), the supply device (21) is a conveyor that transports two articles (cylindrical cans 6) along the travel direction while the articles (6) are arranged side by side in the rack depth direction.

Patent Document

Patent Document 1: Japanese Utility Model Laid-Open No. S63-119509 (FIG. 4)

As with the automated warehouse unit of this Patent Document 1, in the case where the transport device transports two articles together, if there are a plurality of types of articles, it is easier to achieve an improvement in the efficiency of the storage operation of storing the articles in the storage rack by the transport device, an improvement in the efficiency of storing the articles in the storage rack, and the like by transporting the articles of the same type together.

In order to transport two articles of the same type together in the transport device, it is desirable that the two articles of the same type are transported adjacent to each other by the supply device in front of the transport device. However, Patent Document 1 does not particularly disclose a configuration for transporting two articles of the same type adjacent to each other in the supply device.

SUMMARY OF THE INVENTION

In view of the foregoing, if the transport device transports two articles together, an article storage facility is required which includes a supply device capable of supplying two articles of the same type to the transport device with the articles adjacent to each other, with a relatively simple configuration.

The article storage facility according to the present disclosure is an article storage facility including: a plurality of automated warehouse units each including a transport device and a storage rack in which articles transported by the transport device are stored; a supply device configured to supply the articles to the respective transport devices of the plurality of automated warehouse units; and a control device configured to control the supply device, in which the transport device transports two of the articles together, the supply device includes a first conveyor, a plurality of second conveyors branching from the first conveyor, and branching devices that are provided at branching portions between the first conveyor and each of the plurality of second conveyors, and control destinations of the articles, each of the plurality of second conveyors is configured to supply the articles to the transport device of the corresponding automated warehouse unit among the plurality of automated warehouse units, the articles have a plurality of types with mutually different attributes, each of the articles transported by the first conveyor is a target article, and the control device performs selection processing for determining a selected conveyor, which is the second conveyor that is to be the destination of the target article, and controls the first conveyor, the plurality of second conveyors, and the plurality of branching devices to transport the target article to the selected conveyor, in each of the plurality of second conveyors, the article located the farthest upstream is a most-upstream article, and a group of one or more articles that are of the same type as the most-upstream article and are adjacent downstream of the most-upstream article are an adjacent same-type article group, and the selection processing is processing for, if the second conveyor in which the article of the same type as the target article is the most-upstream article and there is no adjacent same-type article group, and the second conveyor in which the article of the same type as the target article is the most-upstream article and there is an even number of articles in the adjacent same-type article group are pairing target conveyors and there is the pairing target conveyor, determining the pairing target conveyor as the selected conveyor, and if there is no pairing target conveyor, determining the second conveyor selected according to a predetermined basic selection rule as the selected conveyor.

According to this configuration, in the selection processing for determining the selection conveyor, which is the second conveyor, and is the destination of the target article transported by the first conveyor, the second conveyor, on which two articles of the same type can be placed adjacent to each other (paired), is set as a pairing target conveyor, and if there is a pairing target conveyor, the pairing target conveyor is set as the selected conveyor, and if there is no pairing target conveyor, the second conveyor selected according to a predetermined selection rule is set as the selected conveyor. Accordingly, on each of the plurality of second conveyors, it is possible to increase the rate at which two articles of the same type can be transported adjacent to each other, and consequently, it is possible to increase the rate at which two articles of the same type can be supplied adjacent to each other to the respective transport devices of the plurality of automated warehouse units.

Further features and advantages of the article storage facility will become apparent from the following description of the embodiment described with reference to the drawings.

DESCRIPTION OF THE INVENTION

An embodiment of an article storage facility will be described with reference to the drawings.

Figure 1:
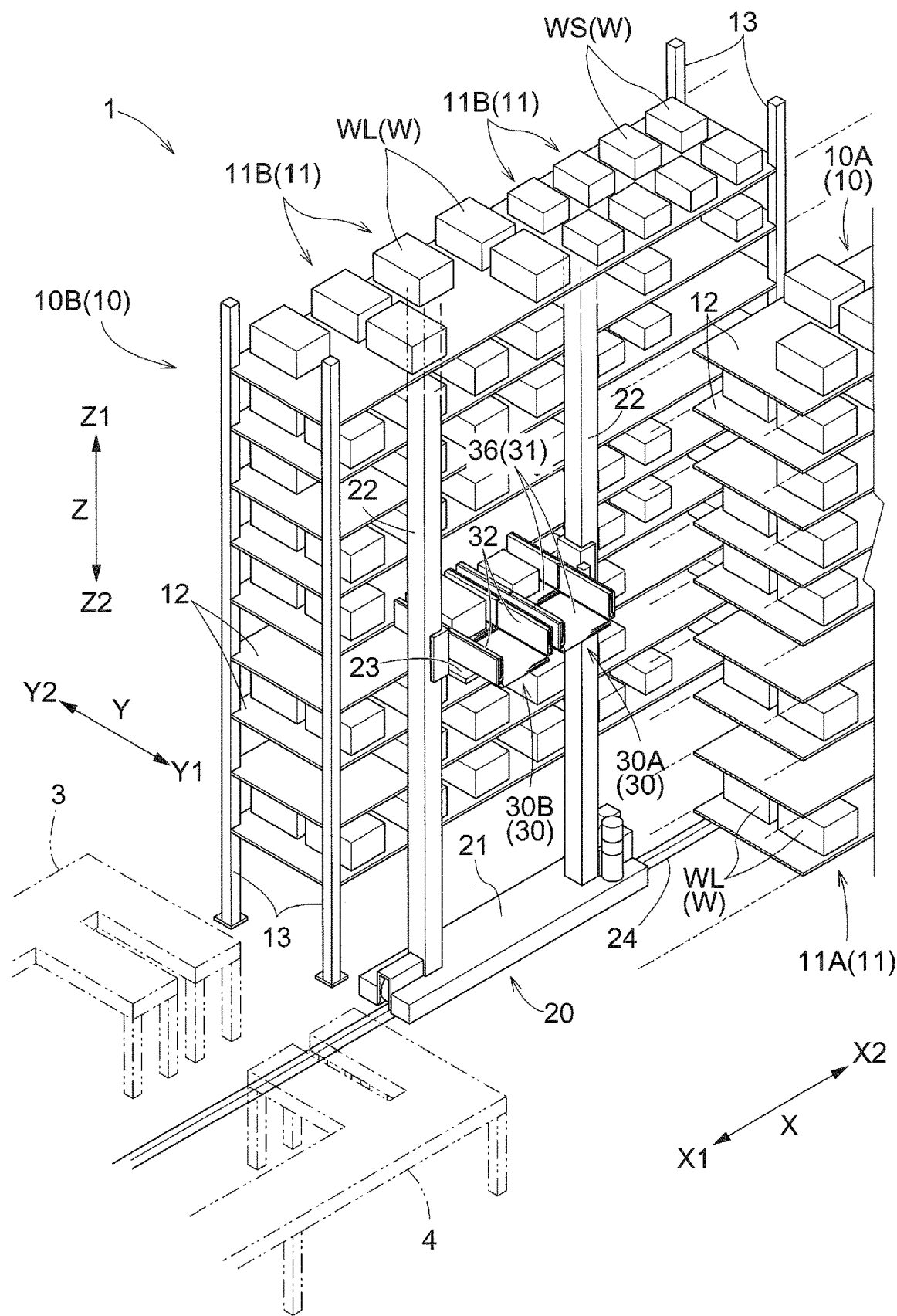
FIG. 1 is a partial perspective view of an automated warehouse unit.
Figure 2:
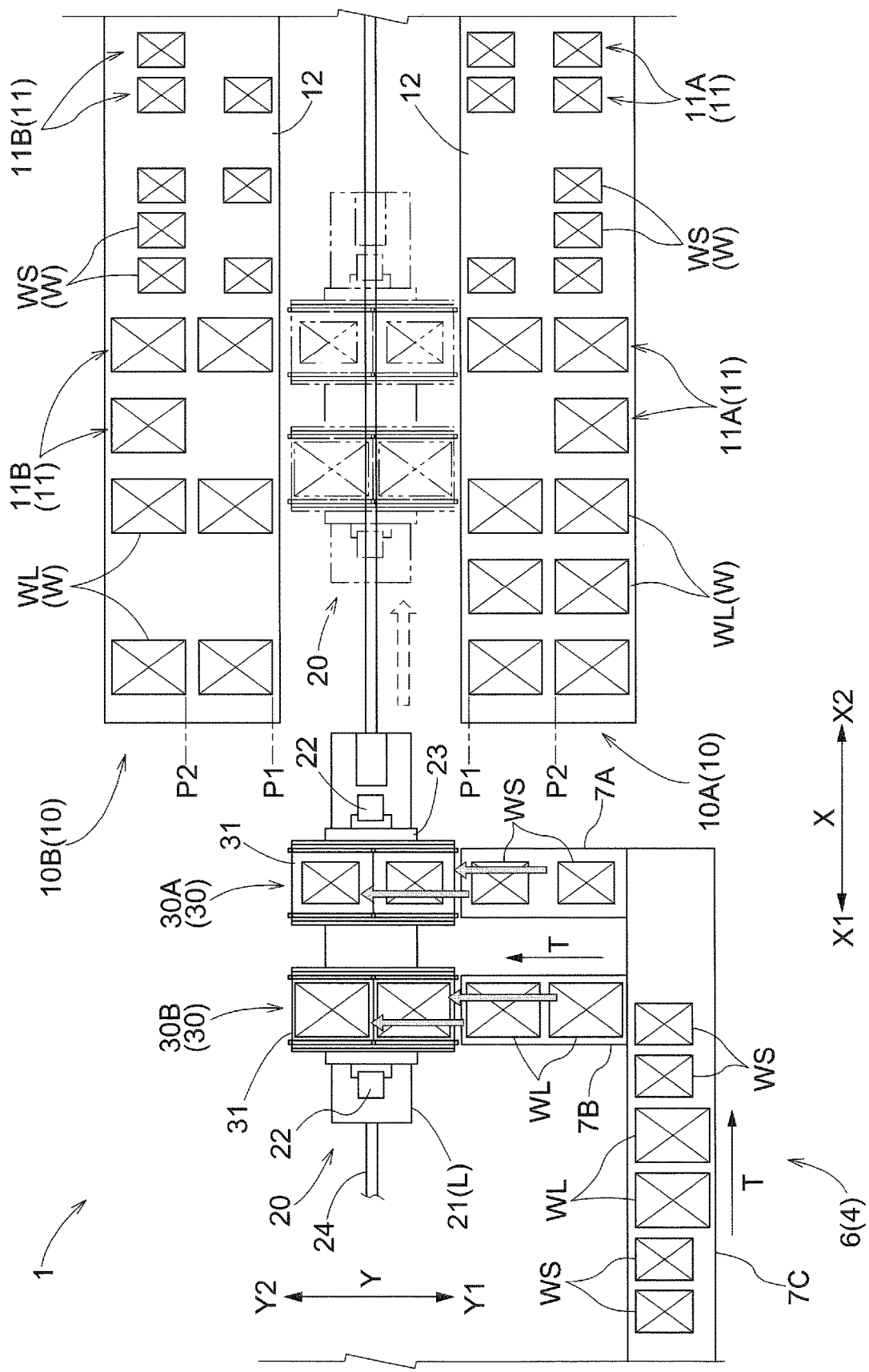
FIG. 2 is a partial plan view of the automated warehouse unit.
Figure 5:
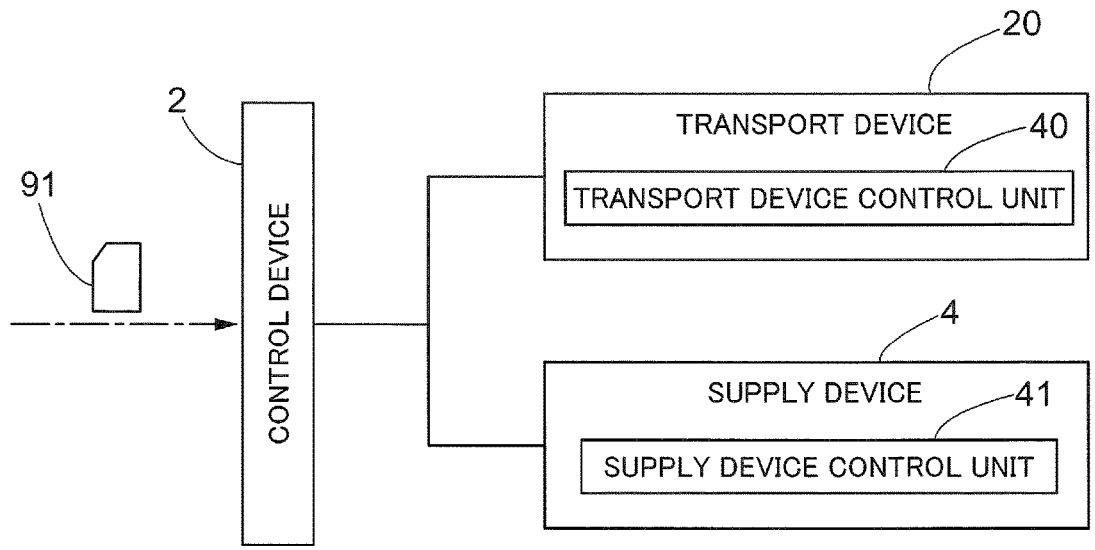
FIG. 5 is a control block diagram.
Figure 7:
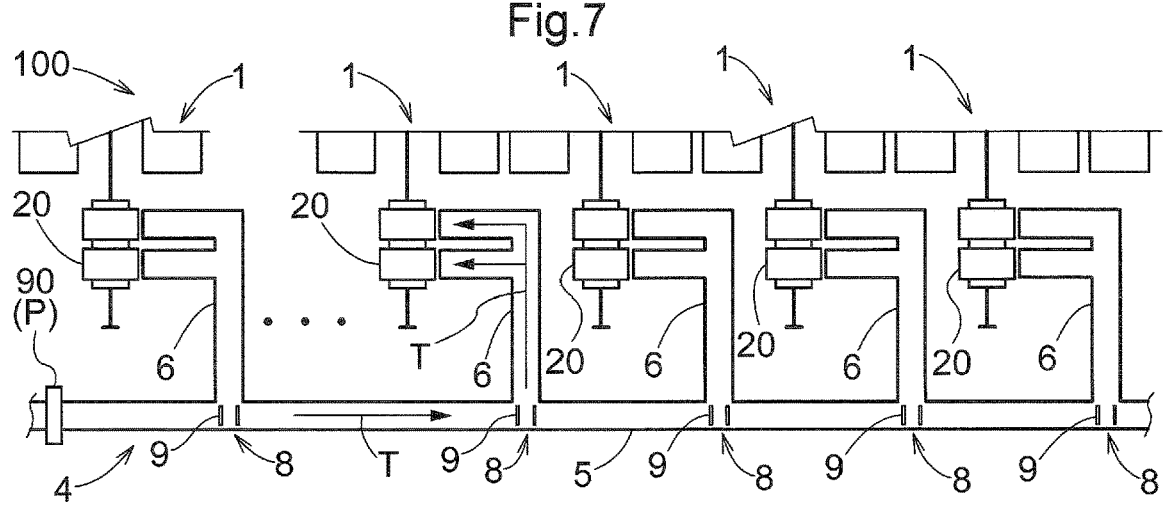
FIG. 7 is a partial plan view of an article storage facility.

As shown in FIG. 7, the article storage facility 100 includes a plurality of automated warehouse units 1, a supply device 4 that supplies articles W to the respective transport devices 20 of the plurality of automated warehouse units 1, and a control device 2 that controls the supply device 4 (see FIG. 5). As shown in FIGS. 1 and 2, the automated warehouse unit 1 includes a transport device 20 and storage racks 10 in which the articles W transported by the transport device 20 are stored. The transport device 20 includes a travel cart 21 that travels along a predetermined first direction X.

The storage racks 10 include a plurality of storage portions 11 arranged along the first direction X. In this embodiment, the article storage facility 100 includes a first storage rack 10A and a second storage rack 10B, which are a pair of storage racks 10 arranged facing each other in the second direction Y. The second storage rack 10B is spaced apart in the second direction Y from the first storage rack 10A. The first storage rack 10A includes a plurality of first storage portions 11A arranged along the first direction X, and the second storage rack 10B includes a plurality of second storage portions 11B arranged along the first direction X. Hereinafter, when describing items held in common by the first storage rack 10A and the second storage rack 10B, these are collectively referred to as the storage racks 10, and when describing items held in common by the first storage portions 11A and the second storage portions 11B, these are collectively referred to as the storage portions 11.

In this embodiment, the first direction X is a direction along a horizontal plane. One side in the first direction X is denoted as a first side X1 in the first direction, and the other side in the first direction X (the side opposite to the first side X1 in the first direction) is denoted as a second side X2 in the first direction. The second direction Y is a direction perpendicular to the first direction X in a view in the up-down direction Z (vertical direction). Here, the second direction Y is the direction along the horizontal plane. One side in the second direction Y is denoted as a first side Y1 in the second direction, and the other side in the second direction Y is denoted as a second side Y2 in the second direction. The first storage rack 10A is arranged on the first side Y1 in the second direction with respect to the second storage rack 10B.

As shown in FIG. 1, the storage racks 10 include support shelves 12 that support the articles W (more specifically, support the articles W from a lower side Z2). The support shelves 12 are fixed to support columns 13 erected on the floor. The articles W are stored on the storage racks 10 while being supported by the support shelves 12. That is, the storage portions 11 are formed by the support shelves 12, and the sizes of the storage portions 11 in the second direction Y are determined according to the dimensions in the second direction Y of the support shelves 12. The support shelves 12 are formed in a plate shape (including a case in which a plurality of members are assembled to form a plate shape as a whole), and in this embodiment, as shown in FIG. 1, the plurality of articles W are arranged side by side in the first direction X and supported by one support shelf 12. The articles W are, for example, cardboard cases, container cases, or the like.

In the present embodiment, each of the plurality of storage portions 11 (specifically, each of the plurality of first storage portions 11A and each of the plurality of second storage portions 11B) can store a plurality of (in this embodiment, two) articles W arranged side by side in the second direction Y. In other words, the articles W handled by the article storage facility 100 include articles W with a dimension (specifically, a dimension in the direction along the second direction Y when stored in the storage portion 11) according to which a plurality of (in this embodiment, two) articles W can be stored side by side in the second direction Y in the storage portion 11. The articles W handled by the article storage facility 100 may also include an article W with the above-described dimension that is so large that the storage portion 11 is occupied by one article W. If two articles W are stored side by side in the second direction Y in the storage portion 11, as shown in FIG. 2, the article W on the near side (the side on which the article W is taken out and put in by the transport device 20) out of the two articles W is stored at a first storage position P1, and the article W on the far side (the side opposite to the near side in the second direction Y) out of the two articles W is stored at a second storage position P2 on the far side with respect to the first storage position P1.

As shown in FIG. 1, in this embodiment, the storage rack 10 includes a plurality of storage portions 11 aligned in the up-down direction Z. Specifically, the plurality of support shelves 12 are fixed to the support columns 13 at intervals in the up-down direction Z, and the articles W are stored while supported on the support shelves 12 in each of a plurality of levels (rack levels) arranged in the up-down direction Z.

The travel cart 21 travels along the first direction X between the first storage rack 10A and the second storage rack 10B in the second direction Y. In this embodiment, the transport device 20 is a stacker crane. Specifically, the transport device 20 includes, in addition to the travel cart 21, masts 22 erected on the travel cart 21, and an elevation unit 23 that rises and lowers (moves along the up-down direction Z) while being guided by the masts 22. The traveling route of the travel cart 21 is formed by a rail 24 installed along the first direction X. The transport device 20 includes a transfer device 30 mounted on the travel cart 21. In this embodiment, the transfer device 30 is mounted on the travel cart 21 by being supported by the elevation unit 23. The transfer device 30 is moved by a traveling operation of the travel cart 21 (in the present embodiment, by a traveling operation of the travel cart 21 and a raising/lowering operation of the elevation unit 23) to a position corresponding to a transfer target location of the article W (a storage portion 11 or later-described discharging device 3 and the supply device 4). The position corresponding to the transfer target location is a position where the article W can be transferred between the later-described placement portion 31 and the transfer target location, and specifically, is a position where the transfer device 30 opposes the transfer target location in the second direction Y (opposes the transfer target location in the second direction Y at the same height (position in the up-down direction Z)). The transfer device 30 performs the transfer operation of the article W between the placement portion 31 and the transfer target location while being arranged at the position corresponding to the transfer target location.

An article W to be loaded on the storage rack 10 is supplied to the transport device 20 from the supply device 4 included on a loading line, and thereafter is transported to a storage portion 11 by the transport device 20 and stored in the storage portion 11. An article W to be discharged from the storage rack 10 is taken out from the storage portion 11 by the transport device 20 and transported to the discharging device 3, and thereafter is carried out by the discharging device 3 to an unloading line or the like. The transport device 20 loads and unloads articles W to and from the first storage rack 10A (specifically, the first storage portion 11A) from the second side Y2 in the second direction, and loads and unloads the articles W to and from the second storage rack 10B (specifically, the second storage portion 11B) from the first side Y1 in the second direction.

As shown in FIGS. 1 and 2, in the present embodiment, the transport device 20 includes a first transfer device 30A and a second transfer device 30B, which are two transfer devices 30. The second transfer device 30B is arranged on the first side X1 in the first direction with respect to the first transfer device 30A. The first transfer device 30A and the second transfer device 30B can perform transfer operations independently of each other. In the present embodiment, each of the first transfer device 30A and the second transfer device 30B includes a placement portion 31 on which a plurality of (in this embodiment, two) articles W can be placed side by side in the second direction Y. In other words, the articles W to be handled by the article storage facility 100 include articles W with a dimension (specifically, a dimension along the second direction Y while placed on the placement portion 31) that allow two articles W to be placed side by side in the second direction Y on the placement portion 31.

The transport device 20 transports two articles W together. Here, transporting two articles W together means transporting one or more sets of two articles W. In the present embodiment, since each of the first transfer device 30A and the second transfer device 30B can hold two articles W, the transport device 20 transports two sets of two articles W each. Note that although the transport device 20 transports two articles W together, there may be a case where the two articles W are not transported together.

Each of the first transfer device 30A and the second transfer device 30B moves the article W in the second direction Y to transfer the article W between the placement portion 31 and the storage portion 11. Each of the first transfer device 30A and the second transfer device 30B is capable of transferring the article W between the placement portion 31 and the first storage position P1, and is capable of transferring the article W between the placement portion 31 and the second storage position P2. In the present embodiment, the first transfer device 30A and the second transfer device 30B are supported side by side in the first direction X by the shared elevation unit 23, and rise and lower in one piece accompanying the rising and lowering of the elevation unit 23. Hereinafter, when describing items held in common by the first transfer device 30A and the second transfer device 30B, they are collectively referred to as the transfer device 30.

Figure 3:
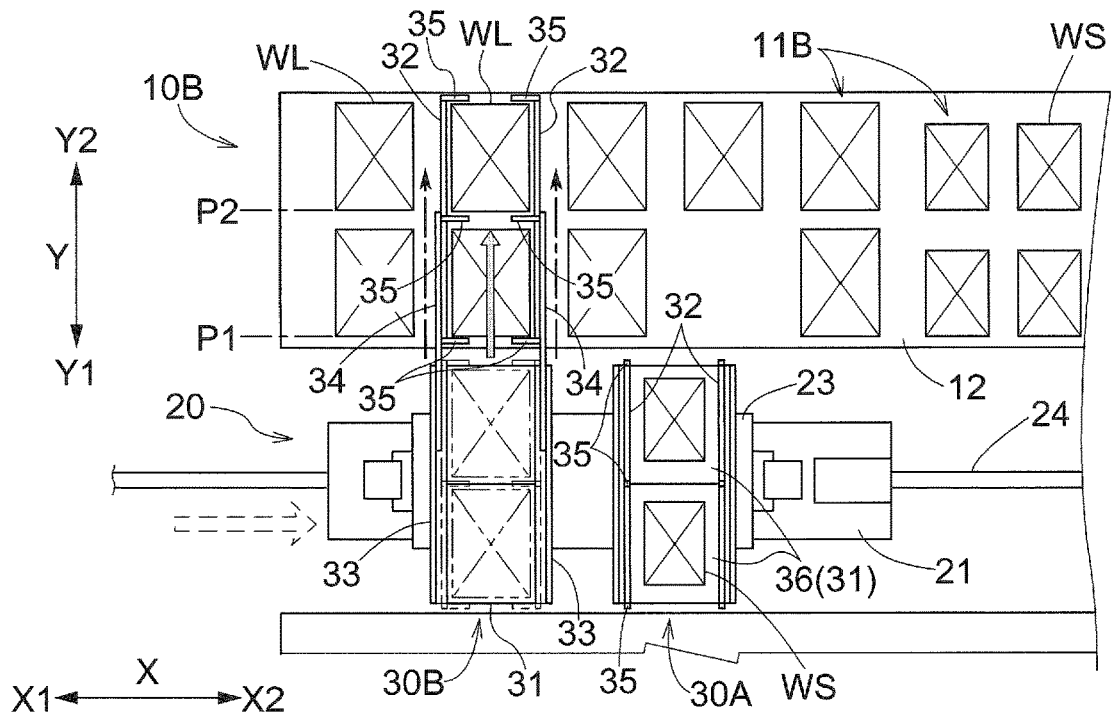
FIG. 3 is a diagram showing an example of loading control.
Figure 4:
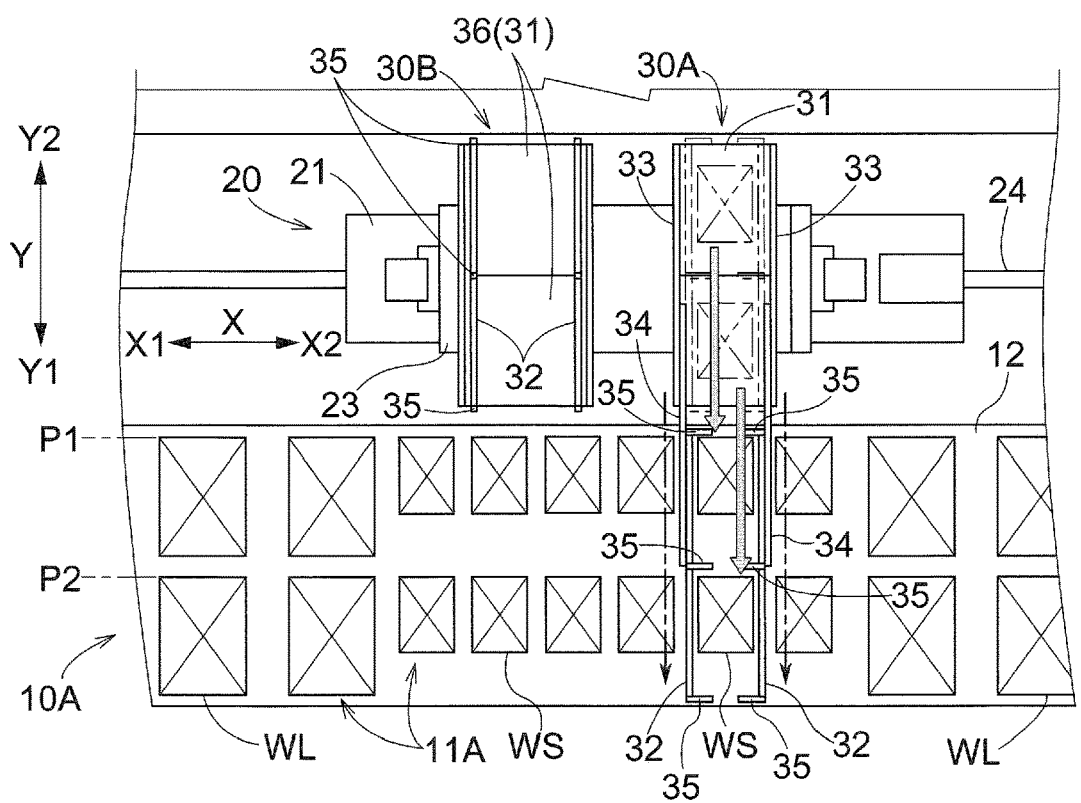
FIG. 4 is a diagram showing another example of loading control.

Although the configuration of the transfer device 30 is not limited to this, in the present embodiment, as shown in FIGS. 1, 3, and 4, the transfer device 30 includes a pair of arms 32 that can change an interval in the first direction X and extend and retract in the second direction Y. Each of the pair of arms 32 is formed in a flat plate shape with the first direction X being the thickness direction (direction perpendicular to the plate surface). The transfer device 30 transfers the article W between the storage portion 11 (the first storage portion 11A or the second storage portion 11B; the same applies hereinafter) and the placement portion 31 by extending and retracting the pair of arms 32 in the second direction Y while the article W is placed between the pair of arms 32 (specifically, between the pair of arms 32 in the first direction X; the same applies hereinafter). Specifically, the transfer device 30 transfers the article W by extending and retracting the pair of arms 32 in the second direction Y while the interval between the pair of arms 32 in the first direction X is an interval corresponding to the dimension in the first direction X of the article W to be transferred, which is placed between the pair of arms 32. The pair of arms 32 can extend and retract on both sides in the second direction Y, and the transfer device 30 can transfer the article W to both the first storage portion 11A and the second storage portion 11B.

As shown in FIGS. 3 and 4, each of the pair of arms 32 is supported slidably in the second direction Y by a fixed member 33 whose position in the second direction Y (position in the second direction Y with respect to the travel cart 21) is fixed. The arms 32 are arranged on the inner side in the first direction X (the side facing the center position in the first direction X between the pair of arms 32) with respect to the fixed members 33 that support the arms 32. The arms 32 may also be directly supported by the fixed members 33, but in this embodiment, the arms 32 are indirectly supported by the fixed members 33 (specifically, supported via intermediate members 34 arranged between the arms 32 and the fixed members 33).

Among the transfer operations of the article W, the operation of delivering the article W from the placement portion 31 to the storage portion 11 is referred to as an unloading operation, and the operation of receiving the article W in the placement portion 31 from the storage portion 11 is referred to as a pickup operation. The transfer device 30 moves the article W arranged between the pair of arms 32 in the second direction Y by extending and retracting the pair of arms 32, thereby transferring the article W. Specifically, the transfer device 30 moves the article W placed on the placement portion 31 to the first side Y1 in the second direction by extending the pair of arms 32 to the first side Y1 in the second direction, thereby performing an unloading operating of delivering the article W from the placement portion 31 to the first storage portion 11A, and moves the article W stored in the first storage portion 11A to the second side Y2 in the second direction by retracting the pair of arms 32 to the second side Y2 in the second direction, thereby performing a pickup operation of receiving the article W in the placement portion 31 from the first storage portion 11A. Also, the transfer device 30 moves the article W placed on the placement portion 31 to the second side Y2 in the second direction by extending the pair of arms 32 to the second side Y2 in the second direction, thereby performing an unloading operation of delivering the article W from the placement portion 31 to the second storage portion 11B, and moves the article W stored in the second storage portion 11B to the first side Y1 in the second direction by retracting the pair of arms 32 to the first side Y1 in the second direction, thereby performing a pickup operation of receiving the article W in the placement portion 31 from the second storage portion 11B.

As shown in FIGS. 3 and 4, in this embodiment, each of the pair of arms 32 is provided with a hook 35 (an example of a contact member), and the transfer device 30 pushes out or pulls in the article W with the hooks 35 by extending and retracting the pair of arms 32, and thereby moves the article W arranged between the pair of arms 32 in the second direction Y. Specifically, the transfer device 30 pushes the article W placed on the placement portion 31 toward the storage portion 11 with the hooks 35 by extending the pair of arms 32 to deliver the article W to the storage portion 11, and pulls the article W stored in the storage portion 11 toward the placement portion 31 with the hooks 35 by retracting the pair of arms 32 to receive the article W in the placement portion 31.

FIG. 3 shows a situation in which the second transfer device 30B unloads two articles W placed side by side in the second direction Y on the placement portion 31 at the same time, and FIG. 4 shows a situation in which the first transfer device 30A unloads two articles W placed side by side in the second direction Y on the placement portion 31, at the same time. In the situation shown in FIG. 3, one article W is pushed out to the second storage position P2 by the hook 35 provided in the center part in the second direction Y of each of the pair of arms 32, and the other article W is pushed out to the first storage position P1 by the hook 35 provided at the end on the first side Y1 in the second direction of each of the pair of arms 32, whereby the two articles W are unloaded. Also, in the situation shown in FIG. 4, one article W is pushed out to the second storage position P2 by the hook 35 provided in the center part in the second direction Y of each of the pair of arms 32, and the other article W is pushed out to the first storage position P1 by the hook 35 provided at the end on the second side Y2 in the second direction of each of the pair of arms 32, whereby the two articles W are unloaded.

As shown in FIGS. 1, 3, and 4, in the present embodiment, the transfer device 30 (specifically, the placement portion 31) includes a conveyor 36 (e.g., a belt conveyor) that transports the article W in the second direction Y. The article W is placed on the placement portion 31 while being supported by the transport surface of the conveyor 36. The conveyor 36 can transport the article W to both sides in the second direction Y. In this embodiment, the placement portion 31 includes two conveyors 36 capable of performing the operation of transporting the articles W independently of each other. These two conveyors 36 are arranged side by side in the second direction Y, one of the two articles W placed side by side in the second direction Y on the placement portion 31 is placed on the conveyor 36 on the first side Y1 in the second direction, and the other of the two articles W is placed on the conveyor 36 on the second side Y2 in the second direction.

In this embodiment, in the unloading operation, the transfer device 30 causes the conveyor 36 on which the article W is placed to operate so as to match the movement direction and movement speed of the article W due to the extension of the pair of arms 32. Also, in this embodiment, in the pickup operation, the transfer device 30 causes the conveyor 36 on which the article W is placed to operate so as to match the movement direction and movement speed of the article W due to the retraction of the pair of arms 32.

The articles W have a plurality of types with mutually different attributes. The attribute of the article W is a classification obtained by dividing the articles W that can be handled in the article storage facility 100 according to a predetermined criterion. In the present embodiment, the attribute of the article W is the dimension of the outer shape of the article W, and specifically, is the dimension of the outer shape of the article W in the first direction X (specifically, the dimension along the first direction X when the article W is placed on the placement portion 31 or stored in the storage portion 11). In the present embodiment, the type of the article W is determined according to which predetermined dimension class the dimension of the article W (the dimensions of the outer shape of the article W) belongs to. Accordingly, articles W of the same type have dimensions in the first direction X that are equivalent (the same or similar) to each other. FIGS. 1 to 4 show two types of articles W, namely a small article WS, which is an article W belonging to one dimension class, and a large article WL, which is an article W belonging to a dimension class for which the dimension in the first direction X is larger than that one dimension class, but there may also be articles W that belong to dimension classes different from these two dimension classes.

In this embodiment, the transfer device 30 extends and retracts the pair of arms 32 in the second direction Y while the article W is placed between the pair of arms 32, thereby transferring the article W between the storage portion 11 and the placement portion 31. For this reason, if two articles W arranged side by side in the second direction Y on the placement portion 31 have the same dimension in the first direction X, the two articles W can be unloaded at the same time. In the present embodiment, the above-described dimension class is set such that if two articles W arranged side by side in the second direction Y on the placement portion 31 are the same type of article W, the transfer device 30 can transfer the two articles W at the same time.

In this embodiment, as shown in FIGS. 1 and 2, articles W of the same type are stored side by side in the second direction Y in each storage portion 11. In this embodiment, the control device 2 sets the position and width of the storage portion 11 in the storage rack 10 in the first direction X according to the dimension of the article W in the first direction X when storing the article W in the storage portion 11. For example, the control device 2 sets the position and width in the first direction X of the storage portion 11 in the storage rack 10 according to the dimension in the first direction X of the articles W to be stored such that the gaps formed between two articles W adjacent to each other in the first direction X are similar to each other. In this manner, by adopting a configuration in which the articles W of the same type are arranged side by side in the second direction Y in each storage portion 11 and the position and width of the storage portion 11 in the storage rack 10 are not fixed, the storage efficiency of the articles W in the storage rack 10 can be improved. Also, from the viewpoint of improving the efficiency of transporting the articles W by the transfer device 20, it is preferable that two articles W of the same type are arranged side by side in the second direction Y on the placement portion 31, and thereby the two articles W placed side by side in the second direction Y on the placement portion 31 can be unloaded at the same time as shown in FIGS. 3 and 4. In this article storage facility 100, by configuring the supply device 4 that supplies articles W to the transport device 20 as follows, it is possible to increase the rate at which two articles W of the same type can be delivered together to each transfer device 30.

As shown in FIG. 7, the supply device 4 includes an upstream conveyor 5, a plurality of downstream conveyors 6 branching from the upstream conveyor 5, and a branching devices 9 that are provided at branching portions 8 between the upstream conveyor 5 and each of the plurality of downstream conveyors 6, and controls the destinations of the articles W. The upstream conveyor 5 transports the articles W arranged side by side in a row. Also, the downstream conveyors 6 (specifically, first transport portions 7A, second transport portions 7B, and third transport portions 7C, which will be described later) transport the articles W arranged side by side in a row. In FIG. 7, the transport direction T of the articles W by the upstream conveyor 5 is indicated by an arrow, and the transport direction T of the articles W by the downstream conveyor 6 is indicated by another arrow. The side toward which the arrow indicating the transport direction T is directed is the downstream side, and the opposite side is the upstream side. The upstream conveyor 5 and the downstream conveyors 6 are, for example, roller conveyors or belt conveyors. In this embodiment, the upstream conveyor 5 corresponds to the "first conveyor" and the downstream conveyors 6 correspond to the "second conveyors".

The branching device 9 switches the destination of the article W arranged at the branching portion 8 (the article W transported from the upstream side of the upstream conveyor 5 to the branching portion 8) between the downstream side relative to the branching portion 8 of the upstream conveyor 5 and the downstream conveyor 6 connected to the branching portion 8. For example, the branching device 9 is formed using a roller conveyor that transports the articles W in the transport direction T of the upstream conveyor 5 and a chain transfer (chain conveyor) that is arranged so as to be able to move up and down in gaps between a plurality of rollers included in the roller conveyor, and transport the articles W in the transport direction T of the downstream conveyor 6. In this case, by lowering the transporting surface of the chain transfer to the lower side Z2 relative to the transport surface of the roller conveyor, the destination of the articles W arranged at the branching portion 8 is switched to the downstream side relative to the branching portion 8 of the upstream conveyor 5. Also, by raising the transport surface of the chain transfer to the upper side Z1 relative to the transport surface of the roller conveyor, the destination of the article W arranged at the branching portion 8 is switched to the downstream conveyor 6 connected to the branching portion 8.

Figure 8:
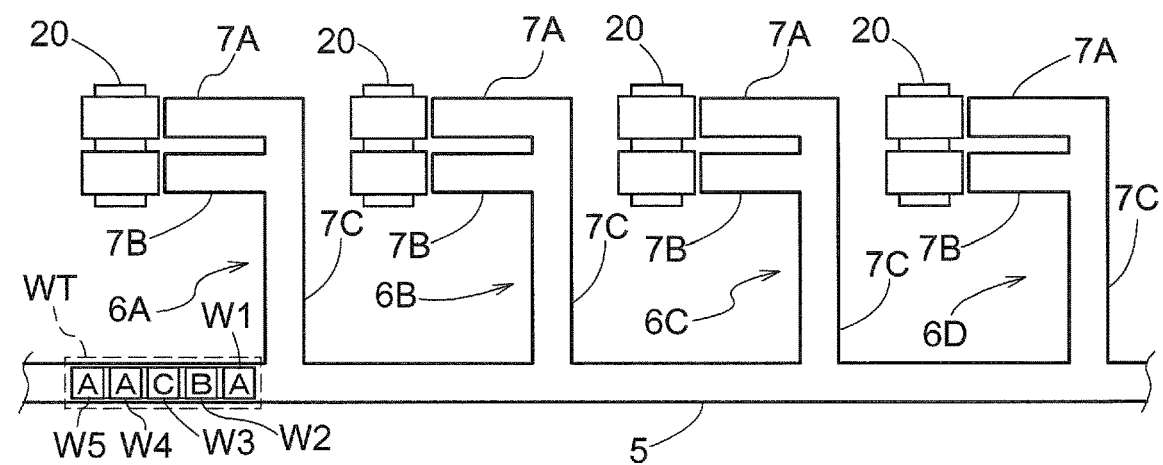
FIG. 8 is a diagram showing an example of a scene in which selection processing is performed.

The plurality of downstream conveyors 6 supply the articles W to the transport devices 20 of the corresponding automated warehouse units 1 out of the plurality of automated warehouse units 1. As shown in FIGS. 2 and 8, in this embodiment, the downstream conveyors 6 include first transport portions 7A, second transport portions 7B and third transport portions 7C. The upstream end of the third transport portion 7C is the upstream end of the downstream conveyor 6 including the third transport portion 7C and is connected to the branching portion 8. The upstream end of the first transport portion 7A is connected to the third transport portion 7C, and the upstream end of the second transport portion 7B is connected to the third transport portion 7C. In this embodiment, the first transport portion 7A is connected to the third transport portion 7C, downstream of the second transport portion 7B. Articles W supplied from the upstream conveyor 5 to the downstream conveyor 6 are transported downstream by the third transport portion 7C and then supplied to the first transport portion 7A or the second transport portion 7B. Although details are omitted here, the downstream conveyor 6 is provided with a device similar to the branching device 9 described above, and the destinations of the articles W transported downstream by the third transport portion 7C can be switched between the first transport portion 7A and the second transport portion 7B.

The first transport portion 7A is arranged so as to be adjacent to the first transfer device 30A on the first side Y1 in the second direction while the travel cart 21 is at a prescribed loading position L (see FIG. 2). The second transport portion 7B is arranged so as to be adjacent to the second transfer device 30B on the first side Y1 in the second direction while the travel cart 21 is at the loading position L. The loading position L is a position where the transport device 20 receives the supply of the articles W from the supply device 4, and specifically, is a position where the first transfer device 30A receives the supply of the articles W from the first transport portion 7A, and the second transfer device 30B receives the supply of the articles W from the second transport portion 7B. That is, when the travel cart 21 is at the loading position L, the first transfer device 30A is arranged at a position corresponding to the first transport portion 7A, and the second transfer device 30B is arranged at a position corresponding to the second transport portion 7B.

The first transport portion 7A transports the articles W in the second direction Y. The transfer operation of the article W from the first transport portion 7A to the first transfer device 30A (specifically, the placement portion 31 included in the first transfer device 30A) is performed by at least one (in this embodiment, both) of the first transport portion 7A and the first transfer device 30A. In this embodiment, the article W is moved from the first transport portion 7A to the placement portion 31 of the first transfer device 30A through the transfer operation of the first transport portion 7A and the transfer operation of the conveyor 36 included in the first transfer device 30A, whereby the article W is transferred from the first transport portion 7A to the first transfer device 30A. In this manner, the first transfer device 30A (in this embodiment, the conveyor 36 included in the first transfer device 30A) moves the article W in the second direction Y to transfer the article W between the placement portion 31 and the supply device 4 (specifically, the first transport portion 7A). Note that the movement operation of the article W from the first transport portion 7A to the first transfer device 30A may also be performed by extending and retracting the pair of arms 32 included in the first transfer device 30A.

The second transport portion 7B transports the articles W in the second direction Y. The transfer operation of the article W from the second transport portion 7B to the second transfer device 30B (specifically, the placement portion 31 included in the second transfer device 30B) is performed by at least one (in this embodiment, both) of the second transport portion 7B and the second transfer device 30B. In this embodiment, the article W is moved from the second transport portion 7B to the placement portion 31 of the second transfer device 30B through the transport operation of the second transport portion 7B and the transport operation of the conveyor 36 included in the second transfer device 30B, and thus the article W is transferred from the second transport portion 7B to the second transfer device 30B. In this manner, the second transfer device 30B (in this embodiment, the conveyor 36 included in the second transfer device 30B) moves the article W in the second direction Y to transfer the article W between the placement portion 31 and the supply device 4 (specifically, the second transport portion 7B). Note that the transfer of the article W from the second transport portion 7B to the second transfer device 30B may also be performed by extending and retracting the pair of arms 32 included in the second transfer device 30B.

As will be described later, in this article storage facility 100, on each of the plurality of downstream conveyors 6, it is possible to increase the rate at which two articles W of the same type can be transported adjacent to each other. Increasing the above rate is realized by the control device 2 performing later-described selection processing, and for example, even if there are fewer downstream conveyors 6 than the number of types of the article W, it is possible to increase the rate at which two articles W of the same type can be transported while adjacent to each other in each of the plurality of downstream conveyors 6. By transporting two articles W of the same type adjacent to each other on the downstream conveyor 6, as shown in FIG. 2, it is possible to deliver two articles W of the same type together to the transfer device 30 without switching the order of transport of the articles W transported to the transport device 20. In the example shown in FIG. 2, two small articles WS transported adjacent to each other in the third transport portion 7C are delivered from the first transport portion 7A to the first transfer device 30A, and two large articles WL transported adjacent to each other in the third transport portion 7C are delivered from the second transport portion 7B to the second transfer device 30B.

As shown in FIG. 7, a detection device 90 for detecting an attribute of an article W is provided on the transport path of the article W transported by the upstream conveyor 5. As described above, in the present embodiment, the attribute of the article W is the dimension (specifically, the dimension in the first direction X) of the outer shape of the article W, and therefore the detection device 90 detects the dimension of the outer shape of the article W. Note that the detection device 90 may also be a device that directly detects the dimension of the article W using detection light or the like, or a device that indirectly detects the dimension of the article W. In the latter case, for example, it is possible to adopt a configuration in which the detection device 90 detects identification information (a barcode, etc.) of the article W to be detected, and the dimension of the article W is acquired by referring to dimension data of the article W associated with the detected identification information. Information on the attribute of the article W detected by the detection device 90 is transmitted to the control device 2, which will be described later, as attribute data 91 of the article W (see FIG. 5).

As shown in FIG. 5, the article storage facility 100 includes a control device 2 that controls the operations of the transport device 20 and the supply device 4. The control device 2 controls the operation of the control target by controlling driving of a driving power source (for example, an electric motor or a solenoid) provided in each portion. The control device 2 includes a computation processing unit such as a CPU and peripheral circuits such as a memory, and each function of the control device 2 is realized through cooperation between these pieces of hardware and a program executed on hardware such as the arithmetic processing unit. The control device 2 may also be constituted by a group of a plurality of pieces of hardware (a plurality of separated pieces of hardware) that can communicate with each other, instead of by one piece of hardware. Also, at least part of the control device 2 may be provided in one piece with the control target. For example, at least part of the control device 2 may be provided in the transport device 20.

The transport device 20 operates under the control of the control device 2. Specifically, the transport device 20 is provided with a transport device control unit 40 (device controller), and the transport device control unit 40 controls each operation of the transport device 20 (traveling operation of the travel cart 21, raising/lowering operation of the elevation unit 23, transfer operation of the transfer device 30) by controlling driving of the driving power source according to a command from the control device 2.

The supply device 4 operates under the control of the control device 2. Specifically, the supply device 4 is provided with a supply device control unit 41 (device controller), and the supply device control unit 41 controls the operations of the supply device 4 (the transport operation of the upstream conveyor 5, the transport operation of the downstream conveyor 6, the branching operating of the branching device 9) by controlling driving of the driving power source according to a command from the control device 2. The branching operation of the branching device 9 is an operation of switching the destination of the article W by the branching device 9.

Figure 6:
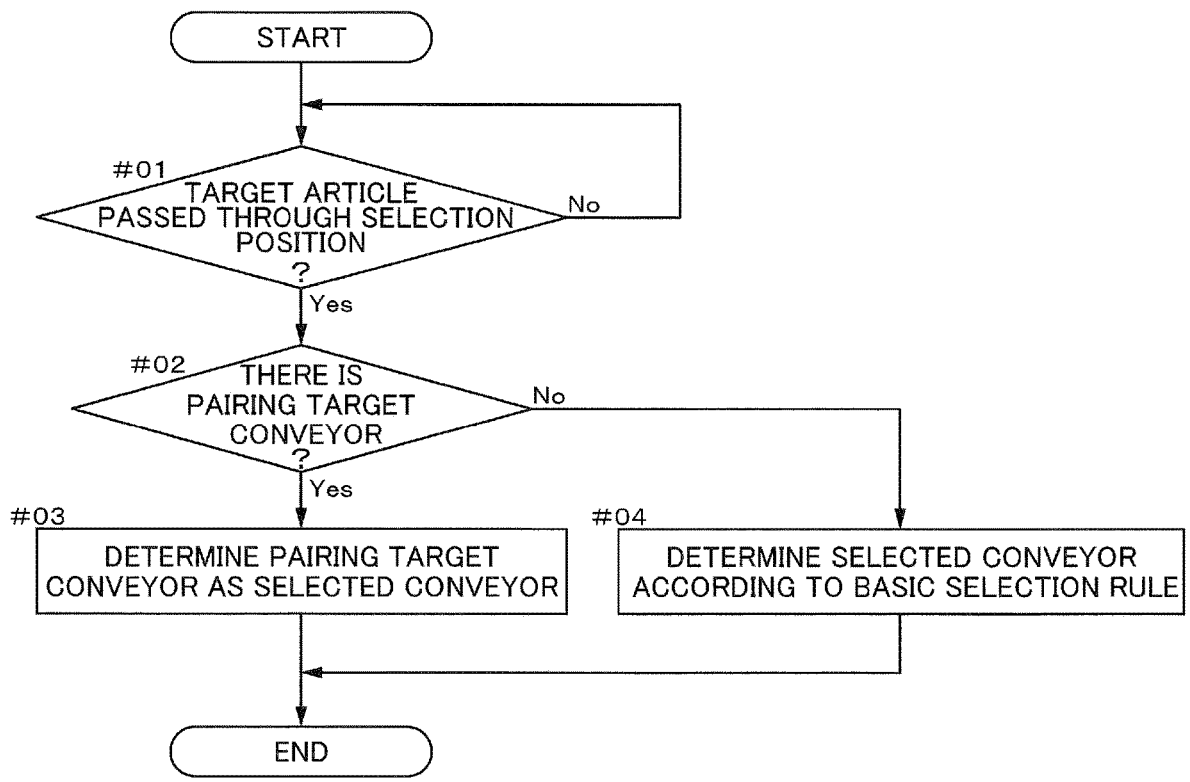
FIG. 6 is a control flow diagram.

Note that technical features of the control device 2 disclosed in this specification can also be applied to a control method for the supply device 4, and the control method for the supply device 4 is also disclosed in this specification. This control method includes a step of performing later-described selection processing (specifically, a step of performing each process (each step) shown in FIG. 6), and a step of controlling the upstream conveyor 5, the plurality of downstream conveyors 6, and the plurality of branching devices 9 so as to transport a target article WT to a selected conveyor determined through the selection processing.

In this article storage facility 100, the control device 2 performs the selection processing described below, whereby it is possible to improve the rate at which two articles W of the same type can be transported adjacent to each other on each of the plurality of downstream conveyors 6. This point will be described with reference to the example shown in FIGS. 8 to 10 and another example shown in FIGS. 11 to 12. Here, a case will be described in which selection processing is performed on four downstream conveyors 6, namely a first downstream conveyor 6A, a second downstream conveyor 6B, a third downstream conveyor 6C, and a fourth downstream conveyor 6D, but the number of downstream conveyors 6 branched from the upstream conveyor 5 is not limited thereto.

In FIGS. 8 to 12 and FIGS. 13 to 15, which will be referred to later, the types of articles W are indicated by letters written inside rectangles representing each article W, and articles W with the same letter represent articles W of the same type. In this embodiment, the control device 2 acquires attribute information (attribute data 91) of the article W detected by a detection device 90 (see FIG. 5), and thus acquires information on the type of each article W transported by the upstream conveyor 5. Also, in FIG. 8, the plurality of articles W transported by the upstream conveyor 5 are, in order from the downstream side, a first article W1, a second article W2, a third article W3, a fourth article W4, and a fifth article W5, and in FIG. 11, the plurality of articles W transported by the upstream conveyor 5 are, in order starting from the downstream side, a sixth article W6, a seventh article W7, and an eighth article W8.

Here, in each of the plurality of downstream conveyors 6, the article W located the farthest upstream is denoted as the most-upstream article WU, and a group of one or more articles W of the same type as the most-upstream article WU, which are adjacent downstream of the most-upstream article WU, is denoted as an adjacent same-type article group GW. In the situation shown in FIG. 8, there is no most-upstream article WU and no adjacent same-type article group GW on any downstream conveyor 6. In the situation shown in FIG. 9, the third article W3 is the most-upstream article WU on the second downstream conveyor 6B, the second article W2 is the most-upstream article WU on the third downstream conveyor 6C, and the first article W1 is the most-upstream article WU on the fourth downstream conveyor 6D. In the situation shown in FIG. 9, there is no adjacent same-type article group GW on any of the downstream conveyors 6.

Figure 11:
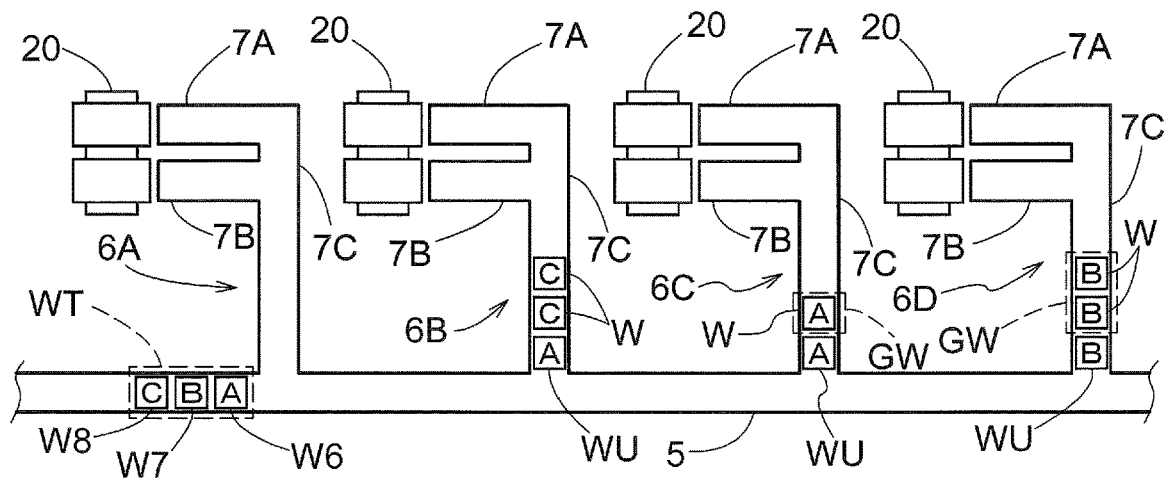
FIG. 11 is a diagram showing another example of a scene in which selection processing is performed.

In the situation shown in FIG. 11, an article W of a type A is the most-upstream article WU on the second downstream conveyor 6B, an article W of the type A is the most-upstream article WU on the third downstream conveyor 6C, and an article W of a type B is the most-upstream article WU on the fourth downstream conveyor 6D. In the situation shown in FIG. 11, the third downstream conveyor 6C has an adjacent same-type article group GW including one article W, and the fourth downstream conveyor 6D has an adjacent same-type article group GW including two articles W.

Each of the articles W transported by the upstream conveyor 5 is set as a target article WT, and the control device 2 performs selection processing for determining a selected conveyor, which is the downstream conveyor 6 that is to be the destination of the target article WT, and the control device 2 controls the upstream conveyor 5, the plurality of downstream conveyors 6, and the plurality of branching devices 9 so as to transport the target article WT to the selected conveyor. The selection processing is processing for, if there is a pairing target conveyor, determining the pairing target conveyor as the selected conveyor, and if there is no pairing target conveyor, determining the downstream conveyor 6 selected according to a predetermined basic selection rule as the selected conveyor. Pairing target conveyors will be described later. If there are a plurality of pairing target conveyors, one pairing target conveyor is selected from among them, and the selected pairing target conveyor is determined as the selected conveyor. In this case, for example, one pairing target conveyor is selected from a plurality of pairing target conveyors according to the basic selection rule. The selection processing is performed on a plurality of articles W transported by the upstream conveyor 5, in order starting from the article W on the downstream side.

The control device 2 executes the selection processing when the target article WT passes through a predetermined selection position P (see FIG. 7) on the upstream conveyor 5. The control device 2 determines the selected conveyor according to the flowchart shown in FIG. 6. That is, the control device 2 determines whether or not the target article WT has passed through the selection position P (step #01), and if it is determined that the target article WT has passed through the selection position P (step #01: Yes), the control device 2 determines whether or not there is a pairing target conveyor (step #02). Then, if there is a pairing target conveyor (step #02: Yes), the control device 2 determines the pairing target conveyor as the selected conveyor (step #03). On the other hand, if there is no pairing target conveyor (step #02: No), the control device 2 determines the selected conveyor according to the basic selection rule (step #04). Specifically, the control device 2 determines the downstream conveyor 6 selected according to the basic selection rule as the selected conveyor. Note that, as shown in FIG. 7, the selection position P is set at a position upstream of the branching portion 8 located the farthest upstream among the plurality of branching portions 8 arranged along the upstream conveyor 5. Although the detection device 90 is provided at the selection position P in the example shown in FIG. 7, the detection device 90 may also be provided upstream of the selection position P.

In the selection processing, the downstream conveyor 6 in which the article W of the same type as the target article WT is the most-upstream article WU and there is no adjacent same-type article group GW, and the downstream conveyor 6 in which the article W of the same type as the target article WT is the most-upstream article WU and there is an even number of articles W in the adjacent same-type article group GW are set as the pairing target conveyors. Note that in the selection processing, if the target article WT for which the selection processing has already been performed has not yet been transported to the selected conveyor determined as the destination (that is, if the target article WT is present on the upstream conveyor 5), it is determined whether or not there is a pairing target conveyor, assuming that the target article WT has been transported to the selected conveyor. For example, in the example shown in FIGS. 8 to 10, in the selection processing in which the fourth article W4 is the target article WT, the fourth downstream conveyor 6D is determined as the selected conveyor, and therefore when performing processing in which the fifth article W5 is the target article WT, if the fourth article W4 has not yet been transported to the fourth downstream conveyor 6D, it is determined whether or not there is a pairing target conveyor, assuming that the fourth article W4 has been transported to the fourth downstream conveyor 6D. In this case, in the selection processing in which the fifth article W5 is the target article WT, the fourth article W4 becomes the most-upstream article WU on the fourth downstream conveyor 6D.

As described above, in the selection processing, if there is no pairing target conveyor, the downstream conveyor 6 selected according to the prescribed basic selection rule is determined as the selected conveyor. The basic selection rule can be, for example, a rule of performing selection (selecting the downstream conveyor 6) based on at least one of the storage rate, which is the number of articles W that have already been stored out of the number of articles W that can be stored in each of the plurality of storage racks 10, and the number of articles W that are being transported on each of the plurality of downstream conveyors 6. Note that "being transported" means a state of being on the downstream conveyor 6, and includes not only undergoing a transport operation but also a case where the transport operation is stopped. Also, the basic selection rule can be a rule of performing selection (selecting the downstream conveyor 6) based on at least one of the storage rate of each of the plurality of storage racks 10, the number of articles W being transported on each of the plurality of downstream conveyors 6, and the position of the branching portion 8 branching from the upstream conveyor 5 in each of the plurality of downstream conveyors 6. The control device 2 acquires information necessary for selecting the downstream conveyor 6 according to the basic selection rule (e.g., information such as the storage rate described above) based on information managed by the control device, or acquires the information from another device.

If the basic selection rule is a rule for selecting the downstream conveyor 6 based on the storage rate of each of the plurality of storage racks 10, it is preferable that, as the storage rate of a storage rack 10 decreases, the priority level of the downstream conveyor 6 (the priority level of being selected as the selected conveyor) that supplies the articles W to the transport device 20 of the automated warehouse unit 1 including the storage rack 10 is increased. In this case, load imbalance among the plurality of automated warehouse units 1 can be reduced.

If the basic selection rule is a rule of selecting the downstream conveyor 6 based on the number of articles W being transported on each of the plurality of downstream conveyors 6, it is preferable that, as the number of articles W being transported on a downstream conveyor 6 decreases, the priority level (priority level of being selected as the selected conveyor) of the downstream conveyor 6 is increased. In this case, load imbalance among the plurality of downstream conveyors 6 can be reduced.

If the basic selection rule is a rule of selecting the downstream conveyor 6 based on the position of the branch portion 8 branching from the upstream conveyor 5 in each of the plurality of downstream conveyors 6, it is preferable that selection as the selected conveyor (i.e., cyclical selection) is performed in order starting from the downstream conveyor 6 in which the position of the branch portion 8 is on the upstream side of the upstream conveyor 5, or in order starting from the downstream conveyor 6 in which the position of the branch portion 8 is on the downstream side of the upstream conveyor 5. In this case, it is possible to reduce load imbalance among the plurality of downstream conveyors 6 with a relatively simple control configuration.

If the basic selection rule is a rule of selecting the downstream conveyor 6 based on both the storage rate on each of the plurality of storage racks 10 and the number of articles W being transported on each of the plurality of downstream conveyors 6, for example, the above-described priority level can be determined such that the priority level increases as the storage rate of the storage rack 10 decreases, and increases as the number of articles W being transported on the downstream conveyor 6 decreases. Also, if the basic selection rule is a rule of selecting the downstream conveyor 6 based on the position of the branching portion 8 branching from the upstream conveyor 5 in each of the plurality of downstream conveyors 6 in addition to at least one of the storage rate of each of the plurality of storage racks 10 and the number of articles W being transported on each of the plurality of downstream conveyors 6, for example, the downstream conveyor 6 can be selected cyclically from among a plurality of downstream conveyors 6 whose above-described priority levels are high to a similar extent.

Next, specific examples will be described with reference to FIGS. 8 to 10. In the situation shown in FIG. 8, there are no articles W on any of the first downstream conveyor 6A, the second downstream conveyor 6B, the third downstream conveyor 6C, and the fourth downstream conveyor 6D. For this reason, in the selection processing for the first article W1, which is the target article WT that is the farthest downstream, there is no pairing target conveyor, and the selected conveyor (downstream conveyor 6) serving as the destination of the first article W1 is determined according to the basic selection rule. Since the first article W1, the second article W2, and the third article W3 are articles W of different types, there is no pairing target conveyor in both the selection processing for the second article W2, which is the next target article WT, and the selection processing for the third article W3, which is the next target article WT. For this reason, the selected conveyor serving as the destination of the second article W2 and the third article W3 is also determined according to the basic selection rule.

Here, the downstream conveyors 6 serving as the destinations of the first article W1, the second article W2, and the third article W3 are selected cyclically in order starting from the downstream conveyor 6 in which the position of the branching portion 8 is on the downstream side of the upstream conveyor 5. Specifically, the fourth downstream conveyor 6D is determined as the selected conveyor for the first article W1, the third downstream conveyor 6C is determined as the selected conveyor for the second article W2, and the second downstream conveyor 6B is determined as the selected conveyor for the third article W3. As a result, as shown in FIG. 9, the first article W1 is transported to the fourth downstream conveyor 6D, the second article W2 is transported to the third downstream conveyor 6C, and the third article W3 is transported to the second downstream conveyor 6B.

Figure 9:
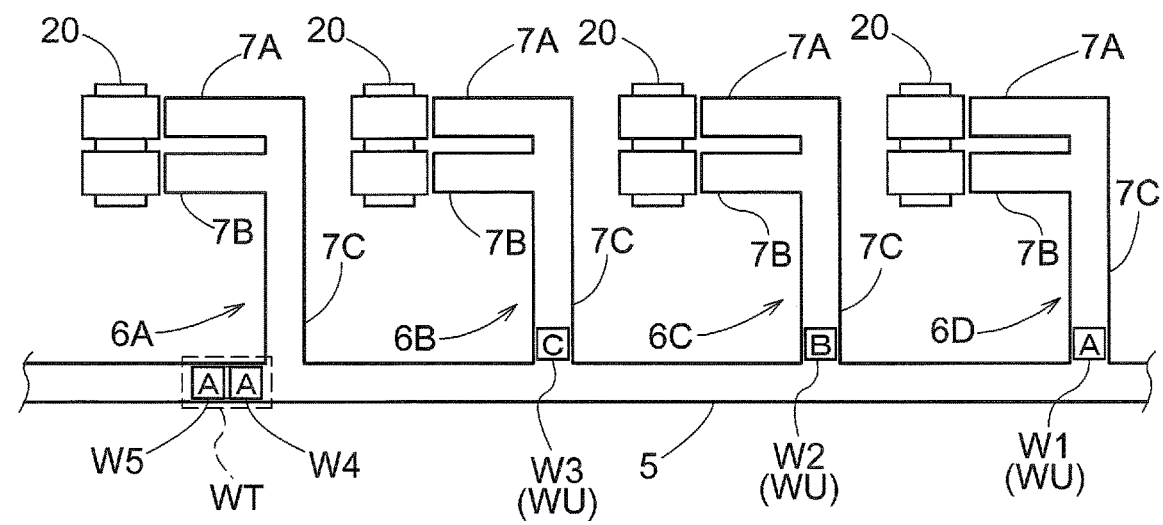
FIG. 9 is a diagram showing a situation at a time after that of FIG. 8.
Figure 10:
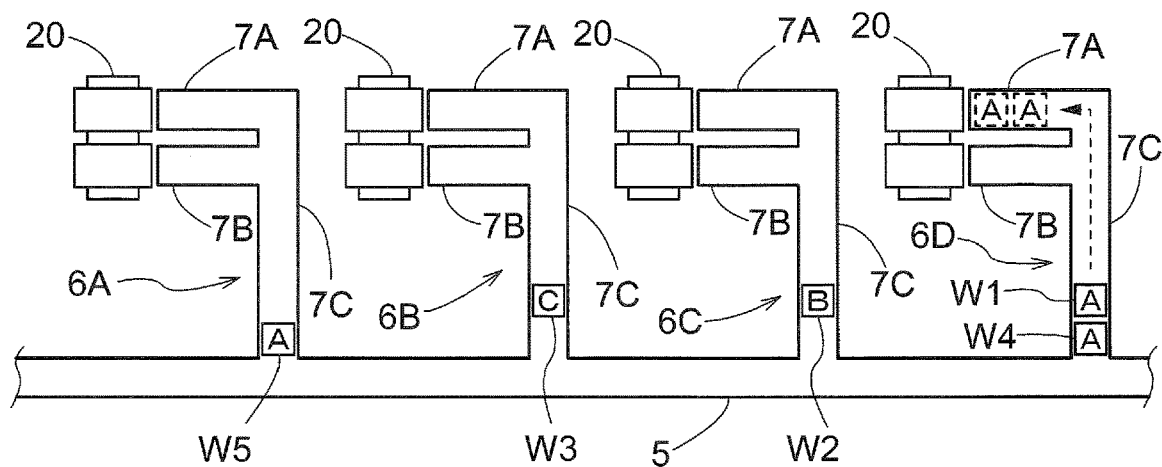
FIG. 10 is a diagram showing a situation at a time after that of FIG. 9.

In the situation shown in FIG. 9, in the selection processing for the fourth article W4, which is the target article WT that is the farthest downstream, the fourth downstream conveyor 6D is the downstream conveyor 6 in which the article W of the same type as the target article WT is the most-upstream article WU and there is no adjacent same-type article group GW. That is, the fourth downstream conveyor 6D is the pairing target conveyor, and the fourth downstream conveyor 6D is determined as the selected conveyor for the fourth article W4. In the selection processing for the fifth article W5, which is the next target article WT, it is determined whether or not there is a pairing target conveyor, assuming that the fourth article W4 has been transported to the fourth downstream conveyor 6D. For this reason, the fourth downstream conveyor 6D is not the pairing target conveyor because, although the article W of the same type as the target article WT is the most-upstream article WU, the number of articles W included in the adjacent same-type article group GW is not even, but odd (specifically, one). As a result, in the selection processing for the fifth article W5, there is no pairing target conveyor, and the selected conveyor that is to be the destination of the fifth article W5 is determined according to the basic selection rule.

Here, among the four downstream conveyors 6, only the first downstream conveyor 6A has no articles W, and the first downstream conveyor 6A, which is the downstream conveyor 6 with the fewest articles W being transported, is determined as the selected conveyor that is to be the destination of the fifth article W5. As a result, as shown in FIG. 10, the fourth article W4 is transported to the fourth downstream conveyor 6D, and the fifth article W5 is transported to the first downstream conveyor 6A.

In the example shown in FIGS. 8 to 10, by sequentially performing the selection processing on a plurality of target articles WT as described above, as shown in FIG. 10, in the fourth downstream conveyor 6D (in this example, the first transport portion 7A), a state in which two articles W of the same type (specifically, articles W of the type A) are arranged adjacent to each other (a paired state) is realized, and the two articles W of the same type can be delivered together to the transport device 20 (specifically, the transfer device 30).

Figure 12:
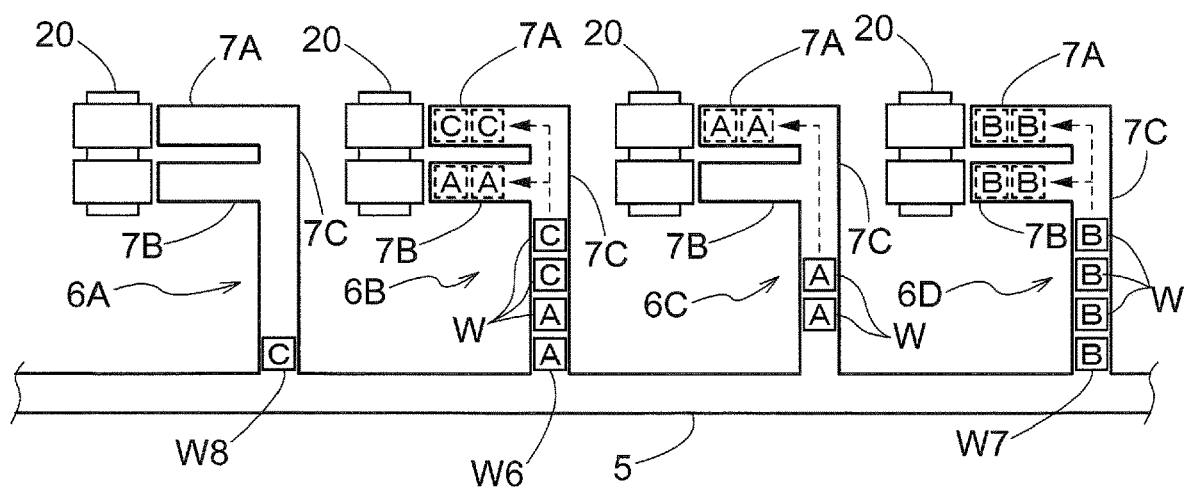
FIG. 12 is a diagram showing a situation at a time after that of FIG. 11.

Next, the examples shown in FIGS. 11 and 12 will be specifically described. In the situation shown in FIG. 11, there are no articles W on the first downstream conveyor 6A, there are three articles W on the second downstream conveyor 6B, there are two articles W on the third downstream conveyor 6C, and there are three articles W on the fourth downstream conveyor 6D. In the selection processing for the sixth article W6, which is the target article WT that is the farthest downstream, the second downstream conveyor 6B is the downstream conveyor 6 in which the article W of the same type as the target article WT is the most-upstream article WU and there is no adjacent same-type article group GW. That is, the second downstream conveyor 6B is the pairing target conveyor. On the other hand, the third downstream conveyor 6C is not the pairing target conveyor because, although the article W of the same type as the target article WT is the most-upstream article WU, the number of the articles W included in the adjacent same-type article group GW is not an even number but an odd number (specifically, one). As a result, the second downstream conveyor 6B is determined as the selected conveyor for the sixth article W6.

In the selection processing for the seventh article W7, which is the next target article WT, the fourth downstream conveyor 6D is the downstream conveyor 6 in which the article W of the same type as the target article WT is the most-upstream article WU and the number of articles W included in the adjacent same-type article group GW is an even number (specifically, two). That is, the fourth downstream conveyor 6D is the pairing target conveyor, and the fourth downstream conveyor 6D is determined as the selected conveyor for the seventh article W7. In the selection processing for the eighth article W8, which is the next target article WT, there is no pairing target conveyor, and the selected conveyor that is to be the destination of the eighth article W8 is determined according to the basic selection rule. Here, among the four downstream conveyors 6, only the first downstream conveyor 6A has no articles W, and the first downstream conveyor 6A, which is the downstream conveyor 6 with the fewest articles W being transported, is determined as the selected conveyor that is to be the destination of the eighth article W8. As a result, as shown in FIG. 12, the sixth article W6 is transported to the second downstream conveyor 6B, the seventh article W7 is transported to the fourth downstream conveyor 6D, and the eighth article W8 is transported to the first downstream conveyor 6A.

In the example shown in FIGS. 11 and 12, by sequentially performing the selection processing on a plurality of target articles WT as described above, as shown in FIG. 12, a state in which two articles W of the same type are arranged adjacent to each other on the second downstream conveyor 6B (in this example, the first transport portion 7A and the second transport portion 7B), the third downstream conveyor 6C (in this example, the first transport portion 7A), and the fourth downstream conveyor 6D (in this example, the first transport portion 7A and the second transport portion 7B) is realized, and these two articles W of the same type can be delivered together to the transport device 20 (specifically, the transfer device 30).

Figure 13:
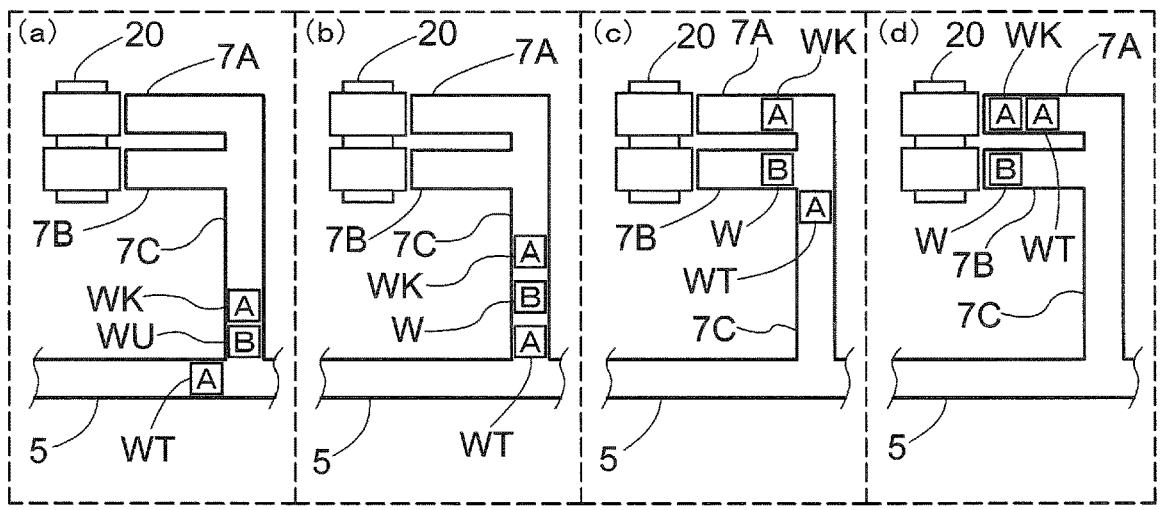
FIG. 13 is a diagram showing an example of processing for advancing the order of transport of an article to the transport device.
Figure 14:
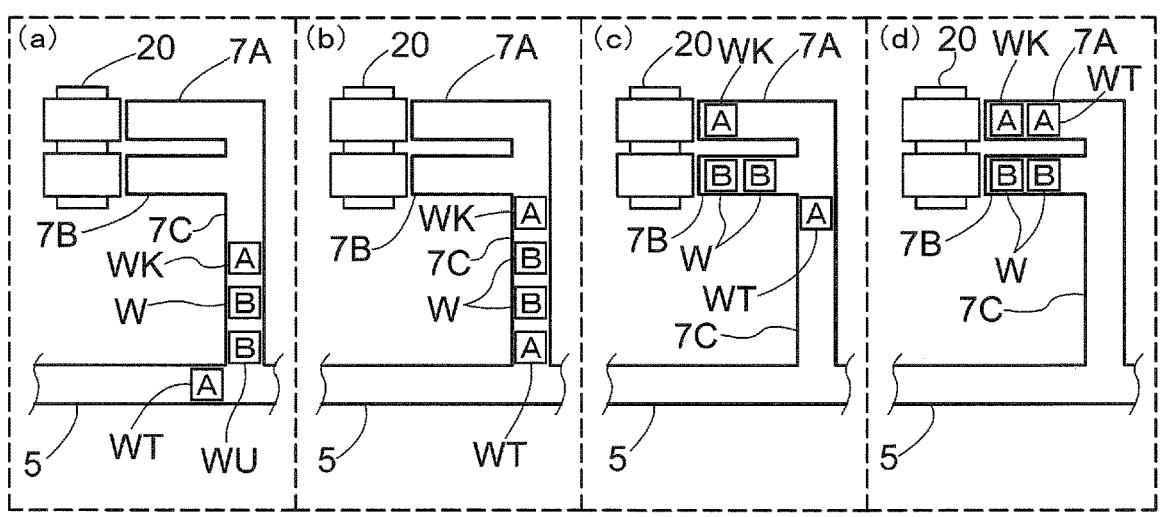
FIG. 14 is a diagram showing another example of processing for advancing the order of transport of an article to the transport device.
Figure 15:
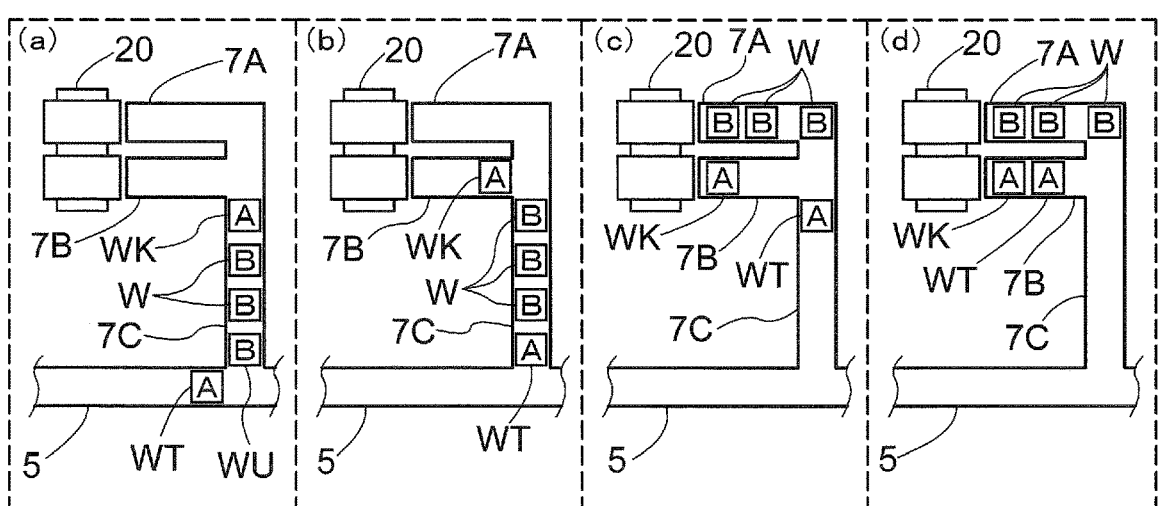
FIG. 15 is a diagram showing yet another example of processing for advancing the order of transport of an article to the transport device.

Incidentally, in this embodiment, each of the plurality of downstream conveyors 6 can advance the order of transport of the advancement target article W to the transport device 20, by a specific number. This point will be described with reference to FIGS. 13 to 15. In FIGS. 13 to 15, the target article WT is an advancement target article W, and situations at points in time when the order of transport of a target article WT to the transport device 20 is advanced are shown chronologically in the order of (a), (b), (c), and (d). Also, in FIG. 13(a), a state is envisioned in which a most-upstream article WU of a different type from that of the target article WT, and a same-type article WK, which is an article W of the same type as the target article WT, are arranged in the stated order from the upstream side on the downstream conveyor 6 (specifically, the third transport portion 7C). Also, in FIG. 14(a), a state is envisioned in which a most-upstream article WU of a different type from that of the target article WT, an article W of the same type as the most-upstream article WU, and a same-type article WK are arranged in the stated order from the upstream side on the downstream conveyor 6 (specifically, the third transport portion 7C). Also, in FIG. 15(a), a state is envisioned in which a most-upstream article WU of a different type from that of the target article WT, two articles W of the same type as the most-upstream article WU, and a same-type article WK are arranged in the stated order from the upstream side on the downstream conveyor 6 (specifically, the third transport portion 7C).

As is evident from FIGS. 13 to 15, even if a plurality of articles W of a different type from that of the target article WT and the same-type article WK are present between the target article WT and the same-type article WK, by transporting the articles W of the different type to a transport portion (the second transport portion 7B in FIGS. 13 and 14, the first transport portion 7A in FIG. 15) different from the transport portion (the first transport portion 7A in FIGS. 13 and 14, the second transport portion 7B in FIG. 15) to which the target article WT and the same-type article WK are to be transported, a state can be realized in which the target article WT and the same-type WK are arranged adjacent to each other by advancing the order of transport of the target article WT to the transport device 20 (see FIGS. 13(d), 14(d), and 15(d)). In the example shown in FIG. 13, the order of transport of the target article WT to the transport device 20 is advanced by one, in the example shown in FIG. 14, the order of transport of the target article WT to the transport device 20 is advanced by two, and in the example shown in FIG. 15, the order of transport of the target article WT to the transport device 20 is advanced by three.

The maximum number by which the order of transport of the target article WT to the transport device 20 can be advanced is determined according to the configuration of the downstream conveyor 6. For example, this maximum number can be increased by increasing the number of articles W that can be arranged on the first transport portion 7A or the second transport portion 7B (in the examples shown in FIGS. 13 to 15, two). Also, this maximum number can be increased by increasing the number of articles W that can be arranged in the portion of the third transport portion 7C that is downstream of the connection portion with the second transport portion 7B (in the example shown in FIGS. 13 to 15, one).

The maximum number by which it is possible to advance the order of transport of the target article WT to the transport device 20 changes depending on the state of the downstream conveyor 6. Specifically, depending on the number and positions of the articles W arranged on the downstream conveyor 6, the maximum number by which it is possible to advance the order of transport of the target article WT to the transport device 20 is smaller than the above-described maximum number, which is determined according to the configuration of the downstream conveyor 6.

Thus, in the present embodiment, each of the plurality of downstream conveyors 6 can advance the order of transport of the advancement target article W to the transport device 20 by a specific number. In view of this, it is possible to adopt a configuration in which the control device 2 acquires information on the specific number for each of the plurality of downstream conveyors 6, and in the selection processing, the pairing target conveyors include a downstream conveyor 6 in which an article W of a different type from that of the target article WT is the most-upstream article WU, there is a same-type article WK that is an article W of the same type as the target article WT within the range of the specific number of articles downstream from the most-upstream article WU, and an odd number of same-type articles WK are being transported. Note that this specific number corresponds to the maximum number described above, and changes according to the state of the downstream conveyor 6. Also, the control device 2 acquires information on the specific number for each of the plurality of downstream conveyors 6 based on information managed by the control device 2, or acquires the information from another device.

In each situation shown in FIGS. 13(*a*), 14(*a*), and 15(*a*), the specific number is "3". Also, in the situation shown in FIG. 13(*a*), the same-type article WK is one downstream from the most-upstream article WU, in the situation shown in FIG. 14(*a*), the same-type article WK is two downstream from the most-upstream article WU, and in the situation shown in FIG. 15(*a*), the same-type article WK is three downstream from the most-upstream article WU. In each situation shown in FIGS. 13(*a*), 14(*a*), and 15(*a*), the downstream conveyor 6 is transporting one same-type article WK. For this reason, the downstream conveyor 6 shown in FIGS. 13(*a*), 14(*a*), and 15(*a*) is a downstream conveyor 6 in which an article W of a different type from that of the target article WT is the most-upstream article WU, there is a same-type article WK within the range of the specific number of articles (here, three) downstream from the most-upstream article WU, and an odd number (here, one) of same-type articles WK are being transported.

For this reason, if the control device 2 is configured as described above, the downstream conveyor 6 shown in FIGS. 13(*a*), 14(*a*), and 15(*a*) is a pairing target conveyor, and if this downstream conveyor 6 is determined as the selected conveyor, the control device 2 controls the downstream conveyor 6 such that the order of transport of the target article WT to the transport device 20 is advanced until the target article WT is arranged adjacent to the same-type article WK as shown in FIGS. 13 to 15. Note that even if each of the plurality of downstream conveyors 6 can advance the order of transport of the advancement target article W to the transport device 20 by a specific number, as described above, it is possible to adopt a configuration in which, in the selection processing, the pairing target conveyors do not include the downstream conveyor 6 in which an article W of a different type from that of the target article WT is the most-upstream article WU, there are same-type articles WK within the range of the specific number of articles downstream from the most-upstream article WU, and an odd number of same-type articles WK are being transported.

OTHER EMBODIMENTS

Next, other embodiments of the article storage facility will be described.

Figure 16:
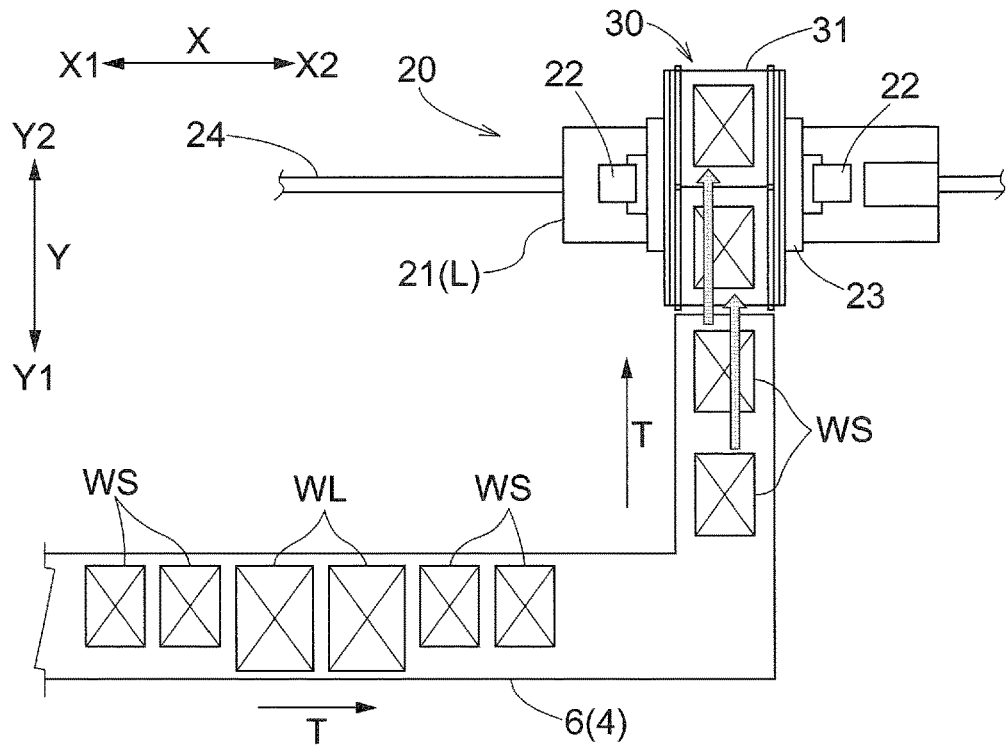
FIG. 16 is a diagram showing another example of the transport device.

(1) In the above embodiment, as an example, a configuration was described in which the transport device 20 includes two transfer devices 30 (specifically, the first transfer device 30A and the second transfer device 30B) capable of performing transfer operations independently of each other. However, the present disclosure is not limited to such a configuration, and as shown in the example of FIG. 16, it is also possible to adopt a configuration in which the transport device 20 includes only one transfer device 30. In this case, the transport device 20 conveys a set of two articles W, unlike in the above embodiment.

Figure 17:
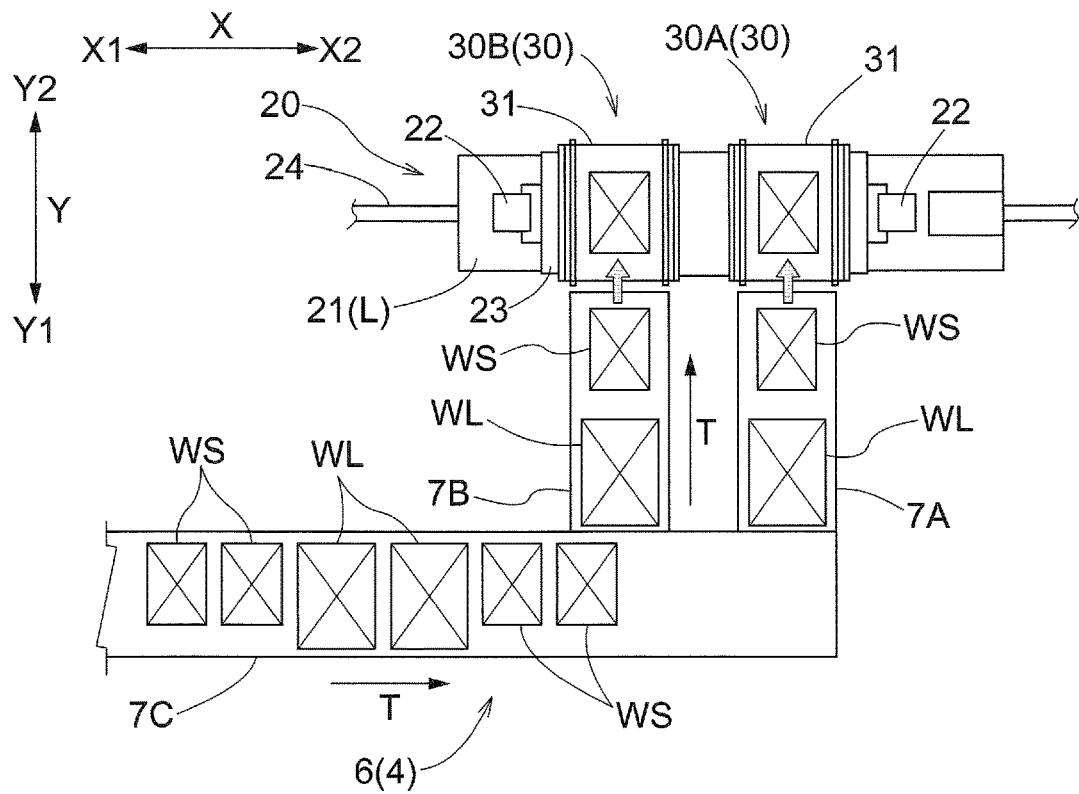
FIG. 17 is a diagram showing yet another example of the transport device.

(2) In the above embodiment, as an example, a configuration was described in which each of the first transfer device 30A and the second transfer device 30B can hold two articles W. However, the present disclosure is not limited to such a configuration, and as shown in the example of FIG. 17, it is also possible to adopt a configuration in which each of the first transfer device 30A and the second transfer device 30B can hold only one article W. In this case, unlike the above embodiment, the transport device 20 transports a set of two articles W (specifically, transports a total of two articles W with the first transfer device 30A holding one article W and the second transfer device 30B holding another article W).

If each of the first transfer device 30A and the second transfer device 30B can hold only one article W, as in the example shown in FIG. 17, two articles W of the same type that are transported adjacent to each other in the third transport portion 7C are supplied separately to the first transport portion 7A and the second transport portion 7B such that the article W delivered from the first transport portion 7A to the first transfer device 30A and the article W delivered from the second transport portion 7B to the second transfer device 30B are articles W of the same type. As illustrated in FIGS. 1 and 2, generally, a plurality of articles W of the same type are arranged adjacent to each other on the storage rack 10. For this reason, by ensuring that the article W held by the first transfer device 30A and the article W held by the second transfer device 30B are articles W of the same type, these two articles W can be stored in the same storage portion 11 or in two storage portions 11 arranged relatively close to each other, and it is possible to achieve an improvement in the efficiency of transporting the articles W by the transport device 20.

(3) In the above embodiment, as an example, a configuration was described in which the attribute of the article W is the dimension of the outer shape of the article W. However, the present disclosure is not limited to such a configuration, and it is also possible to adopt a configuration in which the attribute of the article W is a classification other than the dimension of the outer shape of the article W, and the type of the article W is determined according to the classification. Examples of attributes of the article W other than the dimension of the outer shape of the article W can include the type of cargo (product, etc.) stored in the article W, the order of transport to which the article W belongs (i.e., to which the article W is assigned), the outer shape of the article W, and the weight of the article W.

(4) In the above embodiment, as an example, a configuration was described in which the control device 2 sets the position and width in the first direction X of the storage portion 11 in the storage rack 10 according to the dimension in the first direction X of the article W when storing the article W in the storage portion 11. However, the present disclosure is not limited to such a configuration, and it is also possible to adopt a configuration in which the position and width of the storage portion 11 in the storage rack 10 are fixed.

(5) In the above embodiment, as an example, a configuration was described in which the hooks 35 are provided on each of the pair of arms 32, and the transfer device 30 moves the article W arranged between the pair of arms 32 in the second direction Y by pushing or pulling in the article W with the hooks 35 by extending and retracting the pair of arms 32. However, the present disclosure is not limited to such a configuration, and it is also possible to adopt a configuration in which the hooks 35 are not provided on each of the pair of arms 32. For example, it is possible to adopt a configuration in which the transfer device 30 extends and retracts the pair of arms 32 that hold the article W from both sides in the first direction X, thereby moving the article W arranged between the pair of arms 32 in the second direction Y. In such a configuration, each of the pair of arms 32 may be provided with a conveyor (e.g., a belt conveyor) that comes into contact with the side surface of the article W and transports the article W in the second direction Y, and the article W arranged between the pair of arms 32 may be moved in the second direction Y by the operation of the conveyor, in addition to the extension and retraction of the pair of arms 32. It is also possible to adopt a configuration in which the transfer device 30 includes a support portion that supports the article W from the lower side Z2 instead of the pair of arms 32, and performs a transfer operation of the article W by extending and retracting the support portion in the second direction Y.

(6) In the above embodiment, as an example, a configuration was described in which the placement portion 31 includes the conveyor 36 for transporting the article W in the second direction Y (in the example of the above embodiment, two conveyors 36 arranged side by side in the second direction Y), and in the transfer operation, the transfer device 30 causes the conveyor 36 to operate so as to match the movement direction and movement speed of the article W caused by the extension and retraction of the pair of arms 32. However, the present disclosure is not limited to such a configuration, and it is also possible to adopt a configuration in which the placement portion 31 does not include the conveyor 36, and the article W slides on the placement portion 31 (specifically, on the support surface facing the upper side Z1 of the placement portion 31) accompanying the transfer operation.

(7) In the above embodiment, as an example, a configuration was described in which the first transfer device 30A and the second transfer device 30B are supported side by side in the first direction X by a shared elevation unit 23, and are raised and lowered in one piece accompanying the raising and lowering of the elevation unit 23. However, the present disclosure is not limited to such a configuration, and it is also possible to adopt a configuration in which the first transfer device 30A and the second transfer device 30B are raised and lowered independently of each other due to being supported by two elevation units that can raise and lower independently of each other.

(8) In the above embodiment, a configuration in which the transport device 20 is a stacker crane was described as an example. However, the present disclosure is not limited to such a configuration, and the transport device 20 can also be, for example, a transfer device other than a stacker crane, such as a transfer device that travels along travel routes provided in correspondence with the levels of the storage rack 10.

(9) In the above-described embodiment, as an example, a configuration was described in which the storage rack 10 includes a plurality of storage portions 11 aligned in the up-down direction Z. However, the present disclosure is not limited to such a configuration, and it is also possible to adopt a configuration in which the storage rack 10 includes the storage portions 11 at only one height. Also, in the above-described embodiment, as an example, a configuration was described in which the article storage facility 100 includes a pair of storage racks 10 arranged facing each other in the second direction Y. However, the present disclosure is not limited to such a configuration, and it is also possible to adopt a configuration in which the article storage facility 100 includes the storage rack 10 only on one side in the second direction Y with respect to the travel route of the travel cart 21. Also, in the above-described embodiment, as an example, a configuration was described in which a plurality of articles W can be stored side by side in the second direction Y in each of the plurality of storage portions 11. However, the present disclosure is not limited to such a configuration, and it is also possible to adopt a configuration in which only one article W can be stored in each of the plurality of storage portions 11.

(10) The configurations disclosed in the above-described embodiment can also be applied in combination with configurations disclosed in other embodiments (includes combinations of embodiments described as other embodiments) as long as there are no technical discrepancies. Regarding other configurations as well, the embodiments disclosed in this specification are merely examples in all respects. Accordingly, various modifications can be made as appropriate without departing from the scope of the present disclosure.

SUMMARY OF THE ABOVE EMBODIMENT

An overview of the article storage facility described above will be described below.

An article storage facility including: a plurality of automated warehouse units each including a transport device and a storage rack in which articles transported by the transport device are stored; a supply device configured to supply the articles to the respective transport devices of the plurality of automated warehouse units; and a control device configured to control the supply device, in which the transport device transports two of the articles together, the supply device includes a first conveyor, a plurality of second conveyors branching from the first conveyor, and branching devices that are provided at branching portions between the first conveyor and each of the plurality of second conveyors, and control destinations of the articles, each of the plurality of second conveyors is configured to supply the articles to the transport device of the corresponding automated warehouse unit among the plurality of automated warehouse units, the articles have a plurality of types with mutually different attributes, each of the articles transported by the first conveyor is a target article, and the control device performs selection processing for determining a selected conveyor, which is the second conveyor that is to be the destination of the target article, and controls the first conveyor, the plurality of second conveyors, and the plurality of branching devices to transport the target article to the selected conveyor, in each of the plurality of second conveyors, the article located the farthest upstream is a most-upstream article, and a group of one or more articles that are of the same type as the most-upstream article and are adjacent downstream of the most-upstream article are an adjacent same-type article group, and the selection processing is processing for, if the second conveyor in which the article of the same type as the target article is the most-upstream article and there is no adjacent same-type article group, and the second conveyor in which the article of the same type as the target article is the most-upstream article and there is an even number of articles in the adjacent same-type article group are pairing target conveyors and there is the pairing target conveyor, determining the pairing target conveyor as the selected conveyor, and if there is no pairing target conveyor, determining the second conveyor selected according to a predetermined basic selection rule as the selected conveyor.

According to this configuration, in the selection processing for determining the selected conveyor, which is the second conveyor, and is the destination of the target article transported by the first conveyor, the second conveyor, on which two articles of the same type can be placed adjacent to each other (paired), is set as a pairing target conveyor, and if there is a pairing target conveyor, the pairing target conveyor is set as the selected conveyor, and if there is no pairing conveyor, the second conveyor selected according to a predetermined basic selection rule is set as the selected conveyor. Accordingly, on each of the plurality of second conveyors, it is possible to increase the rate at which two articles of the same type can be transported adjacent to each other, and consequently, it is possible to increase the rate at which two articles of the same type can be supplied adjacent to each other to the respective transport devices of the plurality of automated warehouse units.

Here, it is preferable that each of the plurality of second conveyors is configured to be able to advance an order of transport of the article that is an advancement target to the transport device by a specific number, and the control device acquires information on the specific number for each of the plurality of second conveyors, and in the selection processing, the pairing target conveyors also include the second conveyor in which the article of a different type from that of the target article is the most-upstream article, there is a same-type article, which is the article of the same type as the target article, within a range of the specific number of articles downstream from the most-upstream article, and an odd number of the same-type articles are being transported.

According to this configuration, if each of the plurality of second conveyors can advance the order of transport of the advancement target article to the transport device by a specific number, the pairing target conveyors can also include a second conveyor on which pairing can be performed by performing advancement in such a manner. Accordingly, it is possible to further increase the rate at which two articles of the same type can be supplied adjacent to each other to the respective transport devices of a plurality of automated warehouse units.

Also, it is preferable that the basic selection rule is a rule of performing selection based on at least one of a storage rate, which is the number of the articles that have already been stored out of the number of articles that are storable in each of the plurality of storage racks, and the number of the articles being transported on each of the plurality of second conveyors.

According to this configuration, if there is no pairing target conveyor, the selected conveyor can be appropriately determined according to the storage rate of each storage rack of a plurality of automated warehouse units, and the degree of congestion of the second conveyor corresponding to each of a plurality of automated warehouse units. Accordingly, it is easy to reduce the unevenness of the load in the plurality of automated warehouse units and on the plurality of second conveyors.

Also, it is preferable that the number of the second conveyors is smaller than the number of types of the articles.

If the number of second conveyors is greater than the number of types of articles, it is easy to place (pair) two articles of the same type adjacent to each other on each second conveyor, but if the number of second conveyors is smaller than the number of types of articles, special processing is needed to place two articles of the same type adjacent to each other on each second conveyor. According to this configuration, even if the number of second conveyors is smaller than the number of types of articles, it is possible to increase the rate of transporting two articles of the same type adjacent to each other, which is preferable.

Also, it is preferable that the control device executes the selection processing if the target article passes through a predetermined selection position on the first conveyor, and the selection position is set at a position upstream of the branching portion located the farthest upstream among the plurality of branching portions arranged along the first conveyor.

According to this configuration, it is possible to execute the selection processing before the target article reaches the branching portion located the farthest upstream among the plurality of branching portions arranged along the first conveyor. Accordingly, the selection processing for selecting which of the plurality of second conveyors the target article is to be transported to can be executed at an appropriate time.

Also, it is preferable that the attribute is a dimension of an outer shape of the article, and the type of the article is determined according to which predetermined dimension class the dimension of the article belongs to.

According to this configuration, it is possible to make the outer dimensions of two articles that are adjacent to each other on each of the plurality of second conveyors relatively close to each other. Accordingly, it is easy to transfer two articles at the same time in the operation of supplying articles from the second conveyor to the transport device, in the operation of storing articles from the transport device to the storage rack, and the like. That is, according to this configuration, it is easy to simplify the transfer operation of the two articles.

The article storage facility according to the present disclosure need only achieve at least one of the effects described above.

DESCRIPTION OF REFERENCE SIGNS

1: Automated warehouse unit
2: Control device

4: Supply device
5: Upstream conveyor (first conveyor)
6: Downstream conveyor (second conveyor)
8: Branching portion
9: Branching device
10: Storage rack
20: Transport device
100: Article storage facility
GW: Adjacent same-type article group
P: Selection position
W: Article
WK: Same-type article
WT: Target article
WU: Most-upstream article

The invention claimed is:

1. An article storage facility comprising:
a plurality of automated warehouse units each comprising a transport device and a storage rack in which articles transported by the transport device are stored;
a supply device configured to supply the articles to the respective transport devices of the plurality of automated warehouse units;
a detection device configured to detect attributes of the articles; and
a control device configured to control the supply device, wherein:
the transport device transports two of the articles together,
the supply device comprises a first conveyor, a plurality of second conveyors branching from the first conveyor, and branching devices that are provided at branching portions between the first conveyor and each of the plurality of second conveyors, and control destinations of the articles,
each of the plurality of second conveyors is configured to supply the articles to the transport device of the corresponding automated warehouse unit among the plurality of automated warehouse units,
the articles have a plurality of types with mutually different attributes,
the detection device transmits the detected attributes of the articles to the control device,
each of the articles transported by the first conveyor is a target article, and the control device performs selection processing for determining a selected conveyor, which is the second conveyor that is to be the destination of the target article, and controls the first conveyor, the plurality of second conveyors, and the plurality of branching devices to transport the target article to the selected conveyor,
in each of the plurality of second conveyors, the article located the farthest upstream is a most-upstream article, and a group of one or more articles that are of the same type as the most-upstream article and are adjacent downstream of the most-upstream article are an adjacent same-type article group, and
the selection processing is processing for, if the second conveyor in which the article of the same type as the target article is the most-upstream article and there is no adjacent same-type article group, and the second conveyor in which the article of the same type as the target article is the most-upstream article and there is an even number of articles in the adjacent same-type article group are pairing target conveyors and there is the pairing target conveyor, determining the pairing target conveyor as the selected conveyor, and if there is no pairing target conveyor, determining the second conveyor selected according to a predetermined basic selection rule as the selected conveyor.

2. The article storage facility according to claim 1, wherein:
each of the plurality of second conveyors is configured to be able to advance an order of transport of the article that is an advancement target to the transport device by a specific number, and
the control device acquires information on the specific number for each of the plurality of second conveyors, and in the selection processing, the pairing target conveyors also include the second conveyor in which the article of a different type from that of the target article is the most-upstream article, there is a same-type article, which is the article of the same type as the target article, within a range of the specific number of articles downstream from the most-upstream article, and an odd number of the same-type articles are being transported.

3. The article storage facility according to claim 1, wherein the basic selection rule is a rule of performing selection based on at least one of a storage rate, which is the number of the articles that have already been stored out of the number of articles that are storable in each of the plurality of storage racks, and the number of the articles being transported on each of the plurality of second conveyors.

4. The article storage facility according to claim 1, wherein the number of the second conveyors is smaller than the number of types of the articles.

5. The article storage facility according to claim 1, wherein:
the control device executes the selection processing if the target article passes through a predetermined selection position on the first conveyor, and
the selection position is set at a position upstream of the branching portion located the farthest upstream among the plurality of branching portions arranged along the first conveyor.

6. The article storage facility according to claim 1, wherein:
the attribute is a dimension of an outer shape of the article, and
the type of the article is determined according to which predetermined dimension class the dimension of the article belongs to.

* * * * *